(12) United States Patent
Hwang et al.

(10) Patent No.: US 11,315,224 B2
(45) Date of Patent: Apr. 26, 2022

(54) ELECTRONIC DEVICE APPLYING BOKEH EFFECT TO IMAGE AND CONTROLLING METHOD THEREOF

(71) Applicant: Samsung Electronics Co., Ltd., Gyeonggi-do (KR)

(72) Inventors: Jeena Hwang, Gyeonggi-do (KR); Insung Hwang, Gyeonggi-do (KR); Subash Pandey, Gyeonggi-do (KR); Jongmin Hyun, Gyeonggi-do (KR); Jonghun Won, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 134 days.

(21) Appl. No.: 16/793,473

(22) Filed: Feb. 18, 2020

(65) Prior Publication Data
US 2020/0265565 A1 Aug. 20, 2020

(30) Foreign Application Priority Data
Feb. 20, 2019 (KR) .................. 10-2019-0019996

(51) Int. Cl.
*G06T 5/20* (2006.01)
*G06T 7/11* (2017.01)
(Continued)

(52) U.S. Cl.
CPC ............ *G06T 5/20* (2013.01); *G06T 7/11* (2017.01); *G06T 7/194* (2017.01); *G06T 7/50* (2017.01);
(Continued)

(58) Field of Classification Search
CPC ... G06T 5/20; G06T 7/11; G06T 7/194; G06T 7/50; G06T 7/60; G06T 2207/20021
See application file for complete search history.

(56) References Cited

U.S. PATENT DOCUMENTS 9,148,587 B2 9/2015 Tanaka
9,185,387 B2 11/2015 Campbell et al.
(Continued)

FOREIGN PATENT DOCUMENTS

CN 107948500 A 4/2018

OTHER PUBLICATIONS

Pham ("Asymmetric Recursive Gaussian Filtering for Space-Variant Artificial Bokeh," Digital Image Computing: Techniques and Applications; Date of Conference: Dec. 10-13, 2018) (Year: 2018).*

(Continued)

*Primary Examiner* — Yubin Hung
(74) *Attorney, Agent, or Firm* — Cha & Reiter, LLC.

(57) ABSTRACT

An electronic device and method are disclosed. The electronic device includes a memory and processor, which implements the method, including: obtaining image data for an image, set in the image a region of interest and a background region, using depth information, both including one or more sub-regions, determining respective bokeh characteristics for the one or more first sub-regions and the one or more second sub-regions based on a first characteristic criterion and a second characteristic criterion, respectively, and processing the image to apply a bokeh effect to the plurality of pixels based on the respective bokeh characteristics for the one or more first sub-regions and the one or more second sub-regions.

19 Claims, 20 Drawing Sheets

(51) Int. Cl.
    *G06T 7/194* (2017.01)
    *G06T 7/50* (2017.01)
    *G06T 7/60* (2017.01)

(52) U.S. Cl.
    CPC ...... *G06T 7/60* (2013.01); *G06T 2207/20021* (2013.01)

(56) References Cited

U.S. PATENT DOCUMENTS

| | | | |
|---|---|---|---|
| 9,311,901 B2 | 4/2016 | Webster et al. | |
| 9,436,979 B2 | 9/2016 | Tanaka | |
| 9,508,173 B2 | 11/2016 | Miura et al. | |
| 9,554,037 B2 | 1/2017 | Lee | |
| 10,015,469 B2 | 7/2018 | Campbell et al. | |
| 10,127,639 B2 | 11/2018 | Miura et al. | |
| 10,136,048 B2 | 11/2018 | Manzari et al. | |
| 2006/0171603 A1* | 8/2006 | Jung | H04N 1/00167 382/254 |
| 2007/0177817 A1* | 8/2007 | Szeliski | G06T 5/003 382/275 |
| 2009/0096897 A1 | 4/2009 | Saito | |
| 2010/0265353 A1* | 10/2010 | Koyama | H04N 5/2621 348/222.1 |
| 2011/0102553 A1* | 5/2011 | Corcoran | G06K 9/4661 348/50 |
| 2011/0150349 A1* | 6/2011 | Kojima | G06K 9/00228 382/224 |
| 2011/0273577 A1 | 11/2011 | Saito | |
| 2012/0320230 A1* | 12/2012 | Uehara | H04N 5/23245 348/222.1 |
| 2013/0022290 A1* | 1/2013 | Hori | H04N 5/00 382/274 |
| 2013/0236117 A1* | 9/2013 | Lee | G06T 5/20 382/264 |
| 2014/0009585 A1 | 1/2014 | Campbell et al. | |
| 2015/0002545 A1 | 1/2015 | Webster et al. | |
| 2015/0062384 A1 | 3/2015 | Tanaka | |
| 2015/0116353 A1 | 4/2015 | Miura et al. | |
| 2015/0116542 A1 | 4/2015 | Lee | |
| 2015/0147047 A1* | 5/2015 | Wang | G11B 27/02 386/280 |
| 2015/0178970 A1* | 6/2015 | Pham | G06K 9/6256 382/190 |
| 2015/0195453 A1* | 7/2015 | Saito | G06T 5/002 348/222.1 |
| 2015/0356713 A1 | 12/2015 | Tanaka | |
| 2016/0029004 A1* | 1/2016 | Campbell | H04N 13/122 348/47 |
| 2017/0039686 A1 | 2/2017 | Miura et al. | |
| 2017/0076432 A1* | 3/2017 | Zhang | G06T 5/002 |
| 2017/0084068 A1* | 3/2017 | Son | G06K 9/00208 |
| 2017/0359504 A1 | 12/2017 | Manzari et al. | |
| 2017/0359506 A1 | 12/2017 | Manzari et al. | |
| 2019/0080481 A1* | 3/2019 | Yamaguchi | G06T 3/40 |
| 2019/0132495 A1* | 5/2019 | Ouyang | H04N 5/2226 |
| 2019/0213714 A1* | 7/2019 | Neti | G06T 7/194 |
| 2019/0220089 A1* | 7/2019 | Kakizawa | G06T 7/73 |
| 2019/0304112 A1* | 10/2019 | Hota | G06T 7/60 |

OTHER PUBLICATIONS

Hu et al. ("Real-time depth of field rendering with bokeh effect," IEEE International Symposium on Consumer Electronics; Date of Conference: Jun. 3-6, 2013) (Year: 2013).*
International Search Report dated Jun. 11, 2020.
Gong, Jie, "Using Depth Mapping to realize Bokeh effect with a single camera Android device", XP 055897070.
European Search Report dated Mar. 15, 2022.

* cited by examiner

ELECTRONIC DEVICE APPLYING BOKEH EFFECT TO IMAGE AND CONTROLLING METHOD THEREOF

CROSS-REFERENCE TO RELATED APPLICATION(S)

This application is based on and claims priority under 35 U.S.C. § 119 to Korean Patent Application No. 10-2019-0019996, filed on Feb. 20, 2019, in the Korean Intellectual Property Office, the disclosure of which is incorporated by reference herein its entirety.

BACKGROUND

1. Field

The disclosure relates to a technology in which an electronic device processes an image.

2. Description of Related Art

Modern electronic devices are capable of performing a variety of complex functions such as photographic capture of still images and video, playback of audio, video and other multimedia, image editing, and program downloads, games and broadcasting.

During playback and reproduction functions, the electronic devices do not only generate display the image itself, but also apply visual effects to the image. An example of the visual effect (e.g., a photo "filter" or effect) is a "bokeh" effect. The bokeh effect may also be referred to as an out-of-focus effect, and refers to simulating, by visual effect processing, blurring of background objects when a focus of the camera is set for a foreground object.

In some situations, the bokeh effect is not created during capture of the image. Nevertheless, an electronic device may create the bokeh effect within the image by executing image processing on the image.

The above information is presented as background information only to assist with an understanding of the disclosure. No determination has been made, and no assertion is made, as to whether any of the above might be applicable as prior art with regard to the disclosure.

SUMMARY

When an electronic device uses processes an image to generate a bokeh effect, the generated bokeh effect may not resemble the real-life bokeh effect generated by the actual focus of the camera. For example, when the electronic applies the generated bokeh effect to a subject, the subject may be accidentally blurred.

Aspects of the disclosure are to address at least the above-mentioned problems and/or disadvantages and to provide at least the advantages described below. Accordingly, an aspect of the disclosure is to provide a method for meeting a need to apply various photo effects to a user's image.

In accordance with an aspect of the disclosure, an electronic device may include a memory and a processor electrically connected to the memory. The memory may store instructions that are executable by the processor to cause the electronic device to: obtain image data for an image including a plurality of pixels, set, within the image, a region of interest and a background region, using depth information associated with each of the plurality of pixels, wherein the region of interest includes one or more first sub-regions, and the background region includes one or more second sub-regions, determine respective bokeh characteristics for the one or more first sub-regions and the one or more second sub-regions based on a first characteristic criterion and a second characteristic criterion, respectively, and process the image to apply a bokeh effect to the plurality of pixels based on the respective bokeh characteristics for the one or more first sub-regions and the one or more second sub-regions.

In accordance with an aspect of the disclosure, a method may include: obtaining image data for the image including a plurality of pixels, obtaining depth information for each pixel of the plurality of pixels, set within the image a region of interest and a background region, using the depth information, wherein the region of interest includes one or more first sub-regions, and the background region includes one or more second sub-regions, determine respective bokeh characteristics for the one or more first sub-regions and the one or more second sub-regions based on a first characteristic criterion and a second characteristic criterion, respectively, and process the image to apply a bokeh effect to the plurality of pixels based on the respective bokeh characteristics for the one or more first sub-regions and the one or more second sub-regions.

In accordance with another aspect of the disclosure, a storage medium may include a program is caused to obtain image data for an image, obtain depth information associated with a plurality of pixels, determine a region of interest and a background region in the image using the depth information, determine a bokeh characteristics for each first image region for the region of interest based on a first characteristics criterion and a bokeh characteristics for each second image region for the background region based on a second characteristics criterion distinguished from the first characteristics criterion, and apply a bokeh effect to the plurality of pixels based on the bokeh characteristics for each first image region and the bokeh characteristics for each second image region.

Other aspects, advantages, and salient features of the disclosure will become apparent to those skilled in the art from the following detailed description, which, taken in conjunction with the annexed drawings, discloses certain embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to accompanying drawings is provided to assist in a comprehensive understanding of certain embodiments of the disclosure as defined by the claims and their equivalents. It includes various specific details to assist in that understanding but these are to be regarded as merely examples. Accordingly, those of ordinary skill in the art will recognize that modification, equivalent, and/or alternative on the certain embodiments described herein can be variously made without departing from the disclosure. In addition, descriptions of well-known functions and implementations may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of certain embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
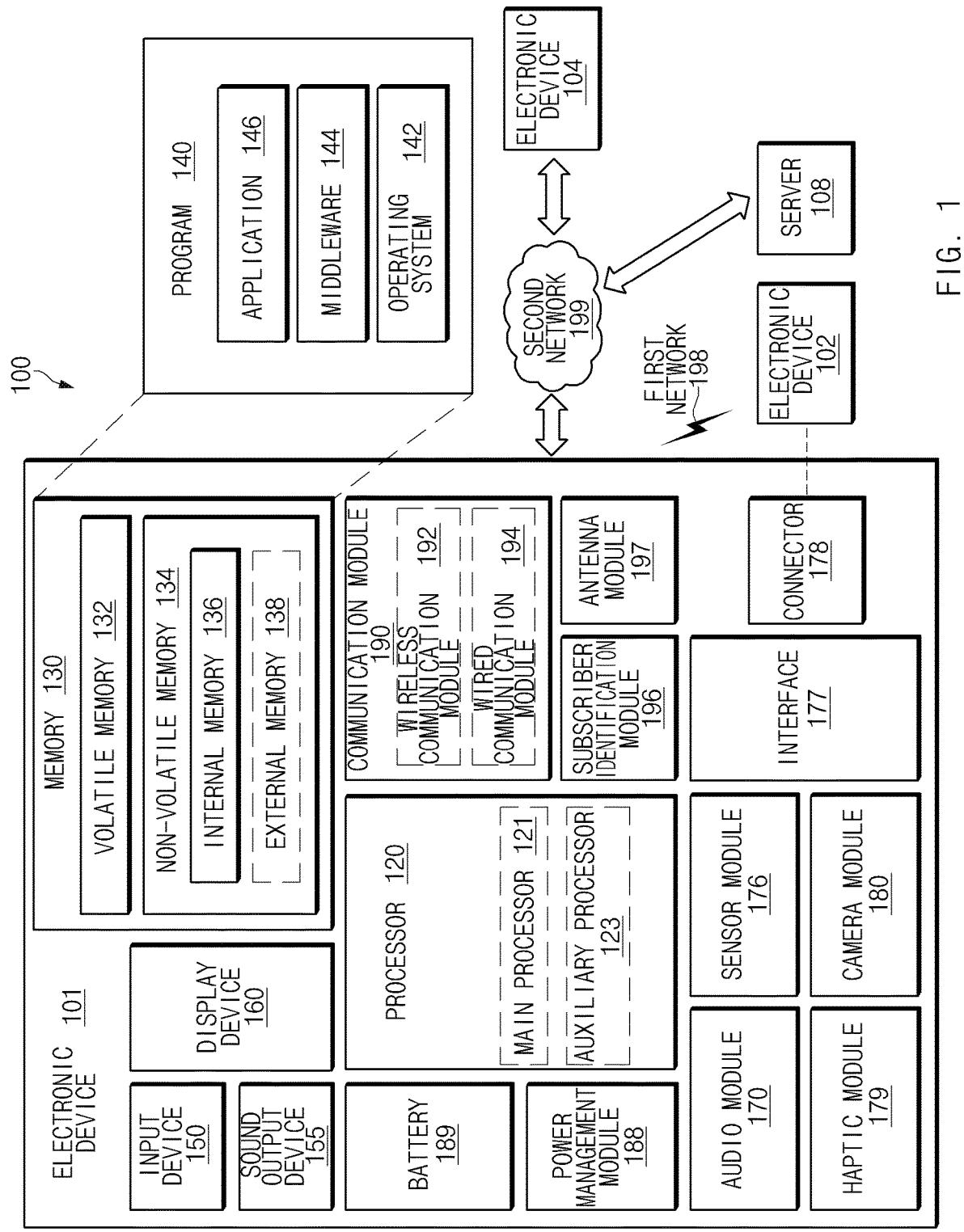
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include at least one processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, and/or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 and/or the non-volatile memory 134. The non-volatile memory 134 may include an internal memory 136 and/or an external memory 138.

The program 140 may be stored in the memory 130 as software, and may include, for example, an operating system (OS) 142, middleware 144, or an application 146.

The input device 150 may receive a command or data to be used by other components (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., the electronic device 102) (e.g., speaker of headphone) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element implemented using a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, when the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
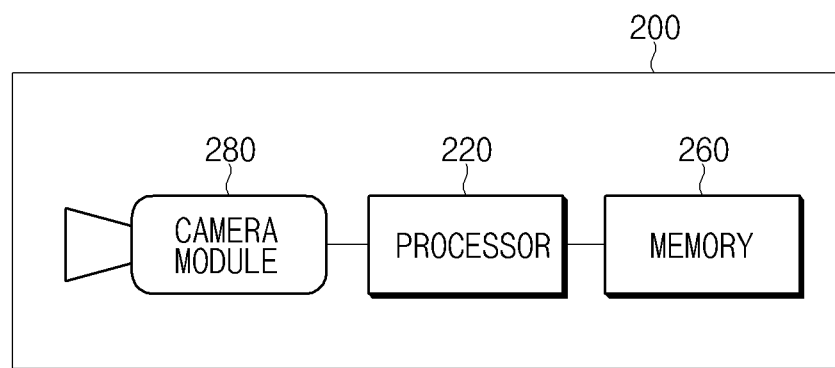
FIG. 2 is a block diagram illustrating a configuration of an electronic device, according to an embodiment.

FIG. 2 is a block diagram illustrating a configuration of an electronic device 200, according to an embodiment.

According to an embodiment, the electronic device 200 (e.g., the electronic device 101 of FIG. 1) may include a processor 220 (e.g., the processor 120 of FIG. 1) and a memory 260 (e.g., the memory 130 of FIG. 1). The memory 260 may store instructions which are capable of being executed by the processor 220. The processor 220 may execute the instructions stored in the memory 260 to process data or control components of the electronic device 200. An operation of the electronic device or the processor disclosed in the disclosure may be performed such that the processor executes the instructions stored in the memory.

According to an embodiment, the processor 220 may obtain image data including an image having a plurality of pixels. According to an embodiment, the electronic device 200 may further include a camera module 280 (e.g., the camera module 180 of FIG. 1) for obtaining the image data. The processor 220 may capture an image using an image sensor included in the camera module 280. According to another embodiment, for obtaining the image data, the processor 220 may read image data that is stored in the memory 260.

According to an embodiment, the processor 220 may apply a "bokeh" effect to the obtained image. Application of the bokeh effect may include changing values of some pixels in the image, to blur portions of the image. According to an embodiment, the processor 220 may determine bokeh characteristics for each image region, based on depth information of the image. The bokeh characteristics for each image region may indicate how to apply the bokeh effect to each respective regions. For example, the bokeh characteristics for each image region may indicate a pattern of the bokeh effect for a designated portion of the image. The pattern of the bokeh effect may include, for example, an intensity and/or direction of the bokeh effect. The intensity of the bokeh effect may include, for example, a degree of blurring to be applied to the respective region or object within the image. The direction of the bokeh effect may indicate a direction or a shape of the blurring as to be applied within the image (e.g., radial, linear, zoom, or other).

In an embodiment, the depth information may include information indicating or associated with a distance or a depth of a subject photographed in the image. However, the depth information should be understood as not limited to an absolute or actual value of a distance of the objects in the image as relative to the camera capturing the image. As an example, the depth information may include a depth map including depth values for each of the pixels included in the captured image. As another example, the depth information may include information that is not the depth value itself for the pixel. The depth information may include a result of analyzing the image. For example, the depth information may include information dividing the captured image into a region of interest (e.g., a subject region), and a background region. The region of interest may refer to a region in which a subject (upon which the focus of the camera would ordinarily rest) is located. For example, the region of interest may refer to a region in a person is depicted within a portraiture. The background and foreground regions may be focusing regions distinct from the subject region. According to an embodiment, the region of interest may include a foreground region which is closer to the camera than the subject, and/or a background region which is farther from the camera than the subject.

According to an embodiment, the depth information may indicate depth relatively between a pixel of a first region and a pixel of another region (e.g., one having greater depth than the other). The processor 220 may determine the depth information of a peripheral pixel based on a difference between a distance value measured for a center pixel corresponding to a center designated in the image sensor included in the camera module 280 and a distance value measured for a peripheral pixel except the center pixel. For example, when the distance value for the center pixel sensed by the camera module 280 is 15 and the distance value for the peripheral pixel is 18, the processor 220 may determine the depth value of the peripheral pixel by 3, which is the difference between the two distance values.

According to an embodiment, when an image including the image captured by the camera module 280 is obtained, the processor 220 may obtain the depth information from the camera module 280. For example, the camera module 280 may include a sensor camera capable of detecting a distance from the camera to the subject (hereinafter, "shooting distance"). The sensor camera may include, for example, a time of flight (TOF) camera having a TOF sensor or a structured light type 3-dimensional camera. The processor 220 may determine the depth value of the pixel of the captured image based on a value sensed by the sensor camera of the camera module 280.

As another example, the camera module 280 may include a multi-camera having a plurality of cameras. The processor 220 may determine the depth of the subject corresponding to the pixel photographed through the camera based on a visible light detected by the image sensor of each of the plurality of cameras.

As still another example, the processor 220 may calculate the depth information with respect to the image obtained through one camera included in the camera module 280. For example, the processor 220 may classify the shape included in the image into a subject of interest or a background using an image classification model which learns a shape corresponding to a subject to be photographed by a user. The processor 220 may obtain the depth information including the information of a region where the shape classified as the subject of interest is located.

Figure 3:
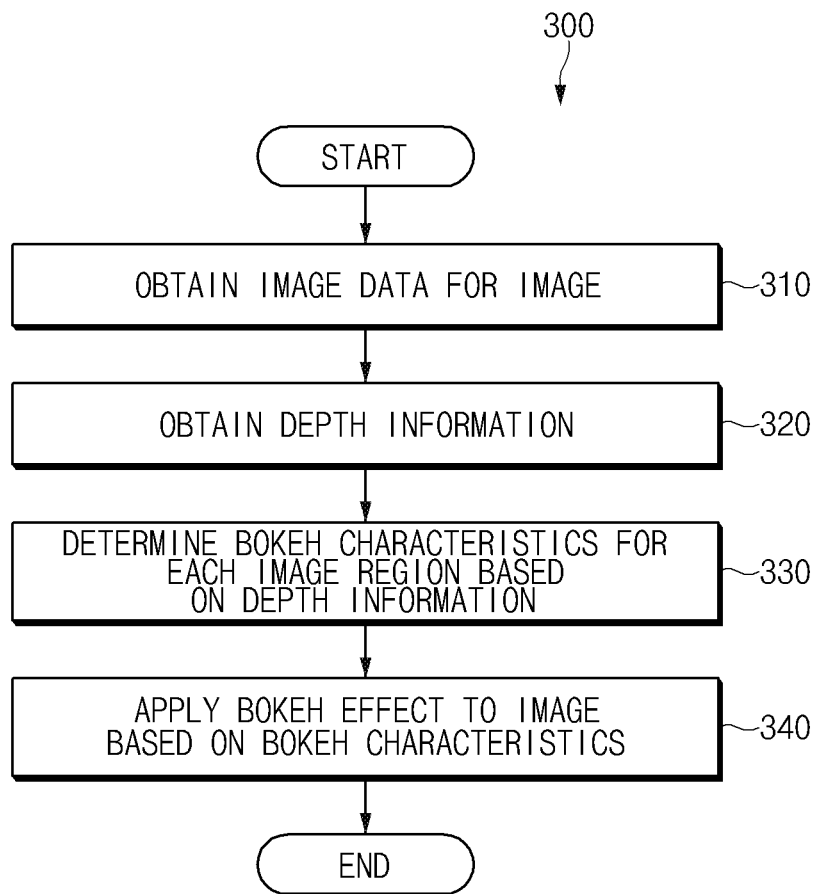
FIG. 3 is a flowchart illustrating a process in which an electronic device processes an image, according to an embodiment.

FIG. 3 is a flowchart 300 illustrating a process in which an electronic device (e.g., the electronic device 101 of FIG. 1 or the electronic device 200 of FIG. 2) processes an image, according to an embodiment.

According to an embodiment, in operation 310, an electronic device may obtain image data for an image. For example, the electronic device may capture the image through the camera module 280 of FIG. 2. For another example, the electronic device may receive the image data from another device (e.g., the electronic device 102, the electronic device 104, or the server 108 of FIG. 1).

According to an embodiment, in operation 320, the electronic device may obtain depth information about the image. For example, the electronic device may obtain depth information, as detected by the camera module 280 of FIG. 2, during capture of the image. As another example, the electronic device may obtain the depth by analyzing the obtained image after capture. As another example, the electronic device may receive the depth information by transmission from another device (e.g., the electronic device 102, the electronic device 104, or the server 108).

In operation 330, the electronic device may determine bokeh characteristics for each image region, based on the depth information. According to an embodiment, the electronic device may determine the bokeh characteristics for each image region from the depth information. For example, a value of the bokeh characteristics (e.g., intensity of the bokeh effect) for each image region may be calculated using a depth value of each pixel included indicated by the depth information. According to another embodiment, the electronic device may divide the image into a plurality of regions based on the depth information, and determine the bokeh characteristics for each image region.

In operation 340, the bokeh effect depending on the bokeh characteristics for each image region may be applied to the image. As described above, the bokeh effect may be applied to the image depending on the bokeh characteristics for each image region determined in operation 330, and thus the bokeh effect suitable for the characteristics of the image may be applied to the image.

Figure 4:
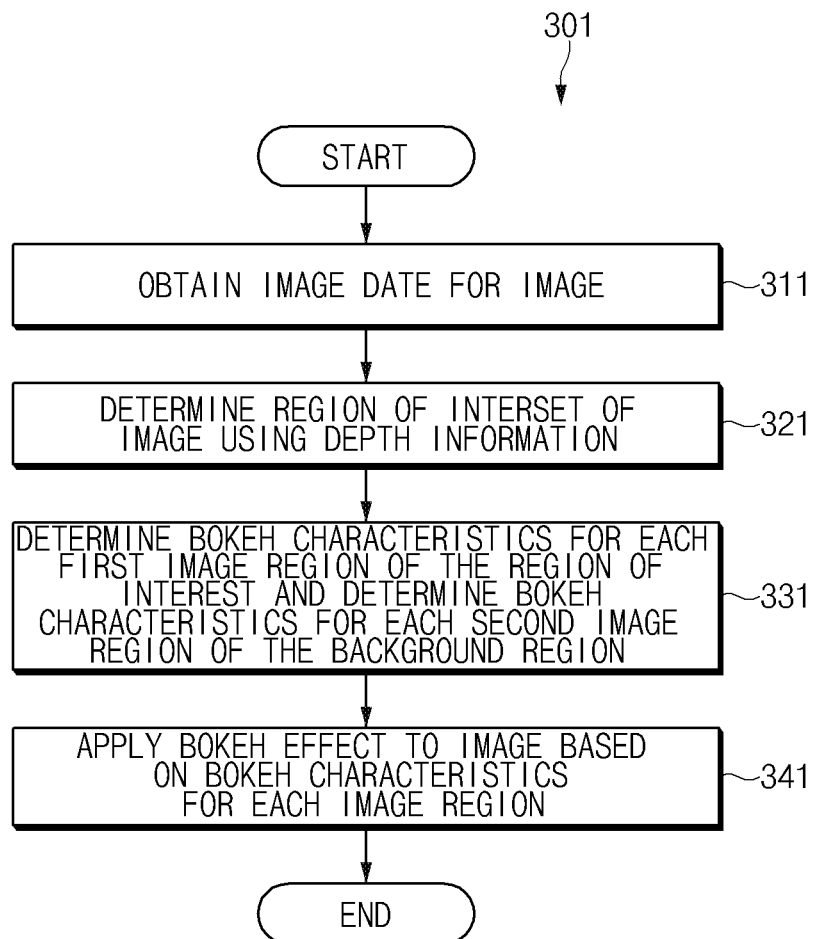
FIG. 4 is a flowchart illustrating a process in which an electronic device determines bokeh characteristics for each image region associated with a region of interest of an image, according to an embodiment.

FIG. 4 is a flowchart 301 illustrating a process in which an electronic device (e.g., the electronic device 101 of FIG. 1 or the electronic device 200 of FIG. 2) determines bokeh characteristics for each image region with respect to a region of interest of an image, according to an embodiment.

In operation 311, the electronic device may obtain image data for an image. In operation 321, the electronic device may determine a region of interest in the image using depth information of the obtained image. According to an embodiment, the electronic device may identify a portion of the image to be set as a background region, excepting the region of interest (e.g., a focal region).

According to an embodiment, in operation 331, the electronic device may determine bokeh characteristics for each first image region with respect to the region of interest (e.g., for each of the one or more sub-regions within the region of interest) and bokeh characteristics for each second image region with respect to the background region (e.g., e.g., for each of the one or more sub-regions within the background region). When the electronic device determines the bokeh characteristics for each first image region, the electronic device may determine the bokeh characteristics for each first image region based on a first characteristics criterion. In addition, the electronic device may determine the bokeh characteristics for each second image region based on a second characteristics criterion distinguished from the first characteristics criterion. The first characteristics criterion and the second characteristics criterion may refer to conditions which are used to determine the bokeh characteristics for each image region. For example, the first characteristics criterion and the second characteristics criterion may define a range of intensity of the bokeh effect included in the bokeh characteristics for each image region. In detail, the first characteristics criterion may be to set the intensity of the bokeh effect within a range of '0' to '2', and the second characteristics criterion may be to set the intensity of the bokeh effect within a range of '0' to '10'.

In operation 341, the electronic device may apply the bokeh effect to the regions (i.e., the region of interest region and the background region and respective sub-regions) of the image according to the individual bokeh characteristics for each image region and sub-region.

Figure 5:
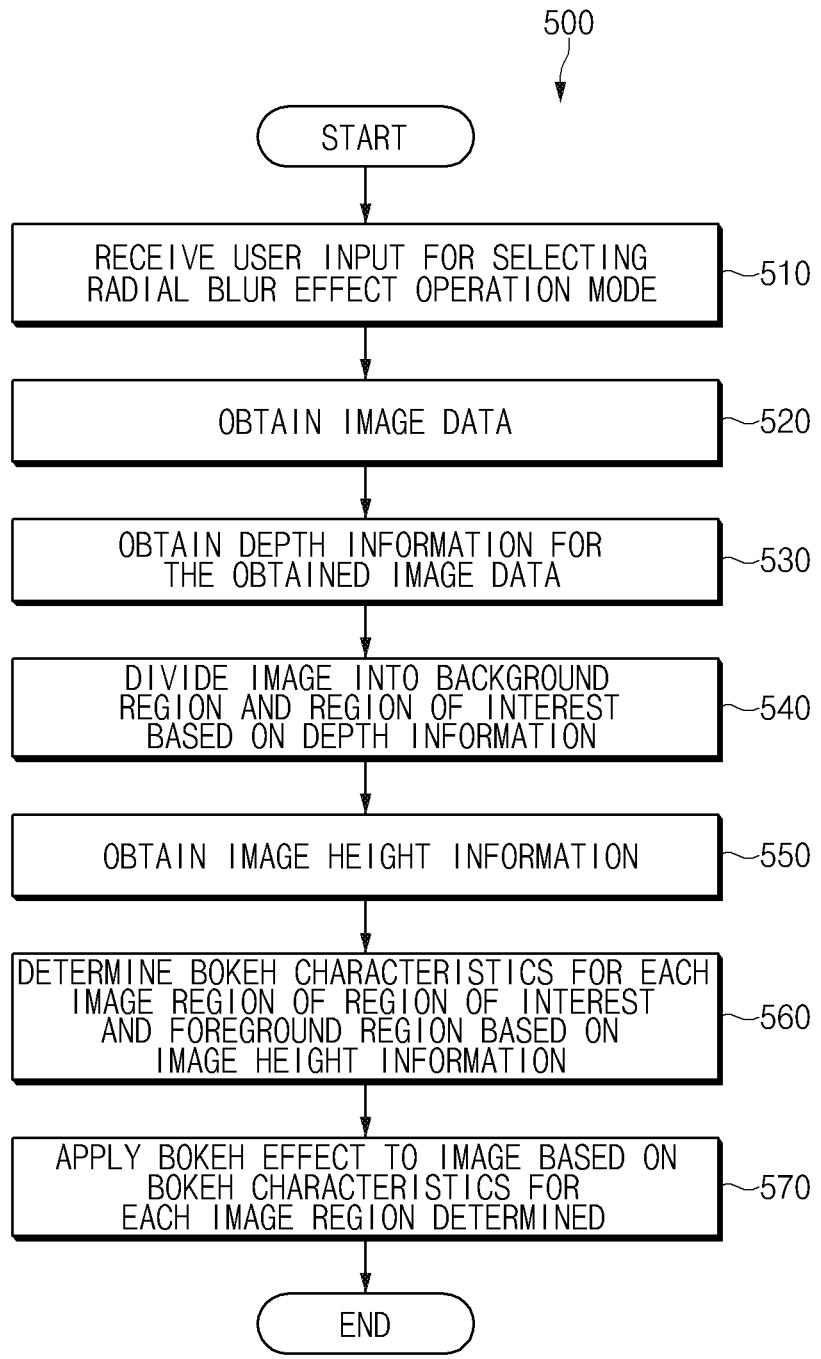
FIG. 5 is a flowchart illustrating a process in which an electronic device applies a bokeh effect to an image to have a radial blur effect on the image, according to an embodiment.

FIG. 5 is a flowchart 500 illustrating a process in which an electronic device (e.g., the electronic device 101 of FIG. 1 or the electronic device 200 of FIG. 2) applies a bokeh effect to an image to have a radial blur effect on the image, according to an embodiment.

According to an embodiment, the electronic device may receive a user input for selecting a bokeh application mode using an input device (e.g., the input device 150 of FIG. 1). Referring to operation 510 of FIG. 5, the electronic device may receive a user input for selecting a radial blur effect operation mode which is one of bokeh application modes. For example, the user input may include a touch input received through a touch screen. According to another embodiment, a form of the user input may be variously modified. For example, the electronic device may select the bokeh application mode depending on a motion value detected by a motion sensor (e.g., the sensor module 176 of FIG. 1). In detail as an example, when it is detected that the electronic device rotates during capturing the image, the electronic device may select the radial blur effect operation mode. As another example, the electronic device may select the bokeh application mode depending on an operation state of the electronic device. The radial blur effect may refer to a photo effect which appears in a captured image when the camera capturing the image captures the image while rotating about a normal axis passing through a center of the image sensor of the camera or an optical axis of a lens included in the camera module. Alternatively, when a lens with severe aberration (e.g., astigmatism or coma aberration) is used, the radial blur effect, which is expressed as if the background is rotated, may appear in the captured image.

Thereafter, in operation 520, the electronic device may obtain image data including the image. In operation 530, the electronic device may obtain depth information for the obtained image data. Then, in operation 540, the electronic device may divide the image into a background region and a region of interest based on the depth information. For example, the electronic device may classify pixels having similar depth values in a depth map included in the depth information as a group and set a region where the pixels included in the classified group are located as the background region or the region of interest.

Figure 6:
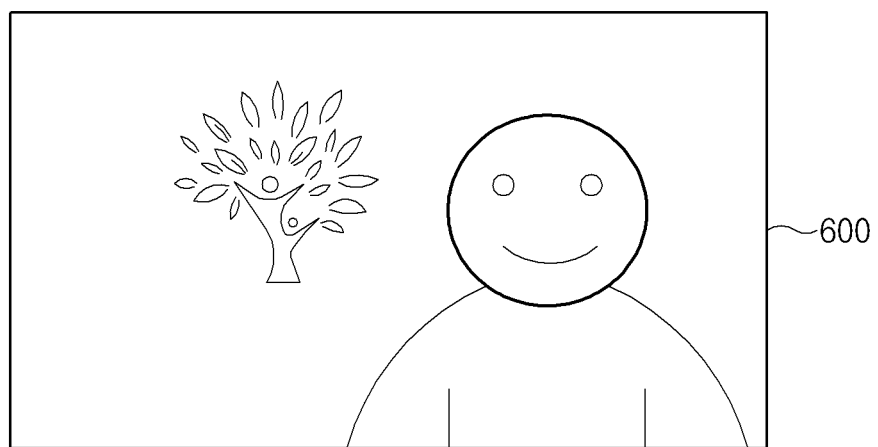
FIG. 6 illustrates a concept of a region of interest and a background region divided by an electronic device and height of an image, according to an embodiment.
Figure 6:
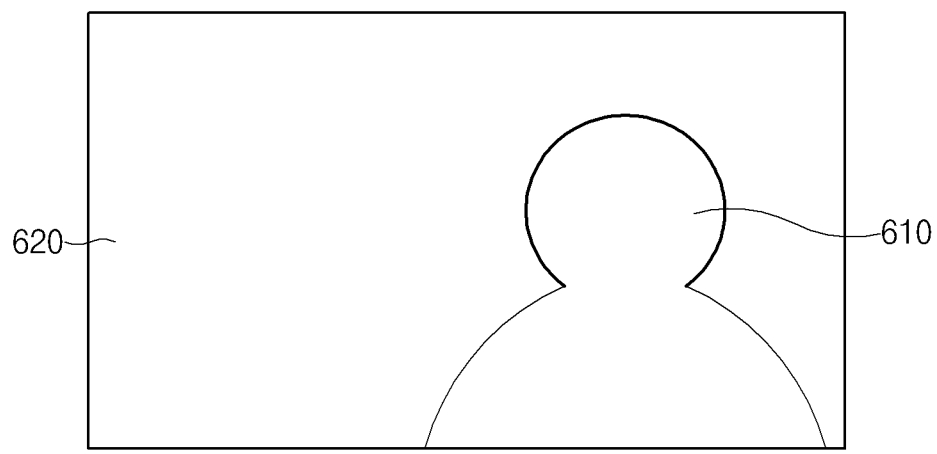
Figure 6:
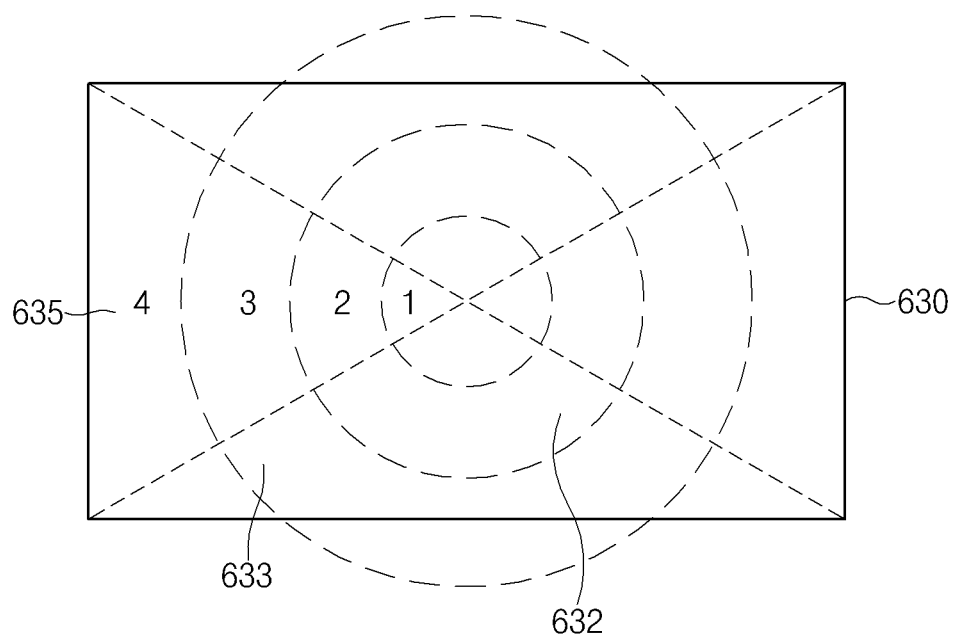

For example, referring to FIG. 6, an image 600 includes depiction of a person and a tree. The electronic device may classify a region including the person as a region of interest 610, and a remaining region as a background region 620.

In operation 550, the electronic device may obtain image height information. The image height information may be referred to as "image field information." The image height information may include a value indicating a distance in the image from a center point of the image to a particular pixel. For example, referring to FIG. 6, image height information 630 may include a value 635 which increases as it grows more distant from the center point of the image. In FIG. 5, operation 550 is illustrated to be performed after operation 540, but an operation order of operations 540 and 550 may be changed according to an embodiment. According to an embodiment, because the depth information is obtained in operation 530, the electronic device may not separately perform operation 550.

Subsequently, in operation 560, the electronic device may determine the bokeh characteristics for each image region, based on the image height information of the background region and the region of interest. Therefore, according to an embodiment, the electronic device may determine the bokeh characteristics for each image region such that the intensity of the bokeh effect increases as the distance from the center point of the image increases. The center point of the image may be referred to as a starting position of the bokeh effect. In addition, the electronic device may determine that the bokeh effect is not applied to the region of interest, or the region of interest has a weaker bokeh effect than the bokeh effect of the background region to provide the bokeh characteristics for each image area with respect to the region of interest. For example, the electronic device may set the intensity of the bokeh effect from '0' to '10' for the background region and the intensity of the bokeh effect from '0' to '2' for the region of interest. However, the disclosure is not limited thereto, and a range of numerical values may be variously set according to embodiments. According to another embodiment, the electronic device may determine the bokeh characteristics for the image region of the pixel based on a difference between a value (e.g., '0') of the image height of the starting position of the bokeh effect and a value of the image height of the pixel to determine the characteristics of the bokeh effect. For example, the electronic device may determine the bokeh characteristics for each image region such that the intensity of the bokeh effect is applied more strongly as the difference of the value of the image height information becomes larger.

Figure 7:
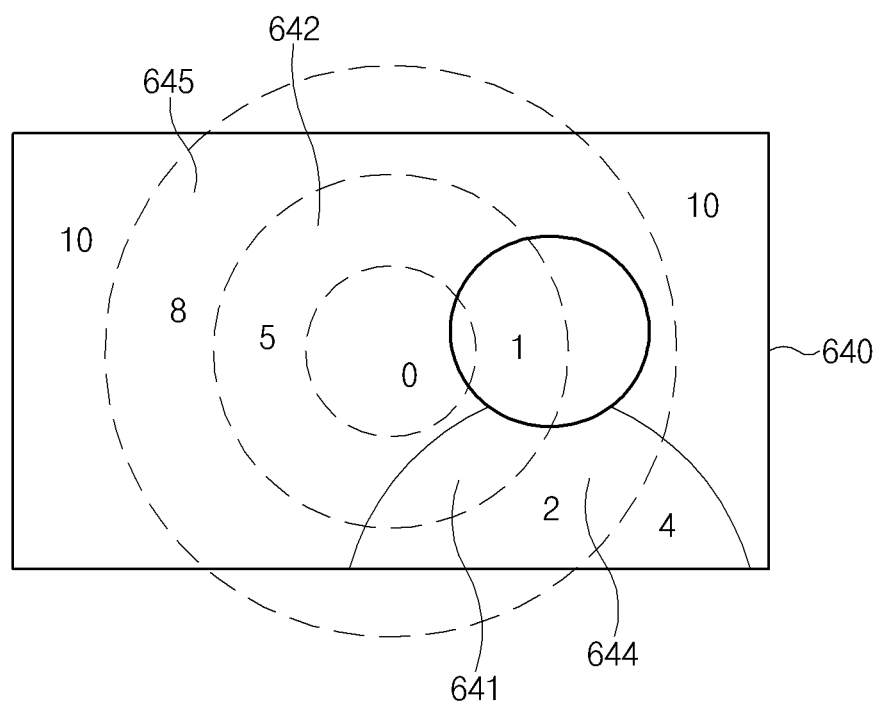
FIG. 7 conceptually illustrates an example of bokeh characteristics for each image region determined based on a region divided by an electronic device and image height, according to an embodiment.

For example, referring to an example 640 of the bokeh characteristics for each image region illustrated in FIG. 7, the electronic device may determine the intensity of the bokeh effect included in the bokeh characteristics for each image region with respect to a region 641 included in a region of interest (the region of interest 610 of FIG. 6), among a region 632 having an image height value of '2', as '1'. The electronic device may determine the intensity of the bokeh effect included in the bokeh characteristics for each image region with respect to a region 642 included in a background region (the background region 620 of FIG. 6), among the region 632 having the image height value of '2', as '5'. The electronic device may determine the intensity of the bokeh effect included in the bokeh characteristics for each image region with respect to a region 644 included in the region of interest (the region of interest 610 of FIG. 6), among a region 633 having an image height value of '3' in FIG. 6, as '2'. The electronic device may determine the intensity of the bokeh effect included in the bokeh characteristics for each image region with respect to a region 645 included in the background region (the background region 620 of FIG. 6), among the region 633 having the image height value of '3' in FIG. 6, as '8'. FIGS. 6 and 7 conceptually describe an embodiment, and are not intended to limit the embodiment by the form or the numerical value.

According to another embodiment, in operation 560, the electronic device may determine the bokeh characteristics for each image region from the depth value included in the depth information. In this case, because the depth information is obtained in operation 530, the electronic device may not separately perform operation 550. However, a reference value for a depth used to determine the bokeh characteristics for each image region in operation 560 may be different from a reference value for the depth used to divide the region in operation 540. For example, the reference value used in operation 560 may be a value smaller than the reference value used in operation 540.

Furthermore, in operation 560, the electronic device may determine a direction of the bokeh effect included in the bokeh characteristics for each image region as a direction depending on the radial blur effect operation mode. For example, the electronic device may determine the direction of the bokeh effect in an arc direction of a circle centered on a center point of the image.

Figure 8:
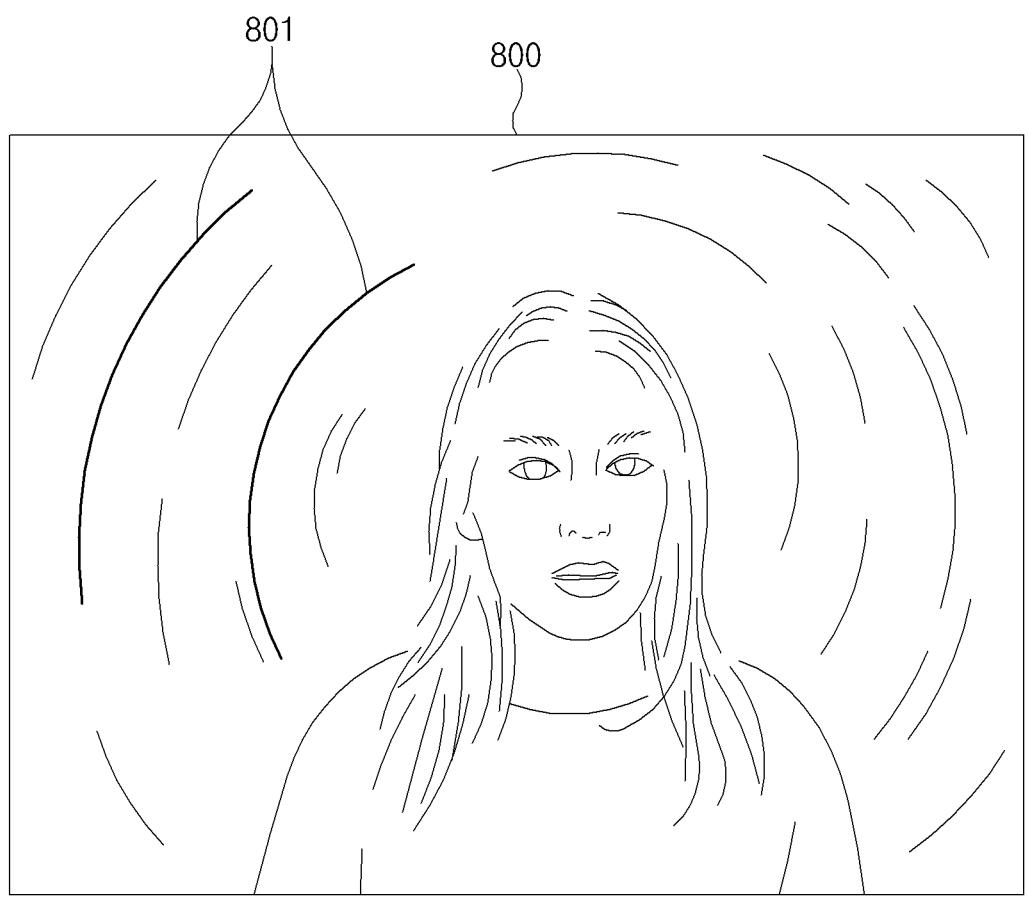
FIG. 8 illustrates an example of an image to which an electronic device according to an embodiment applies a bokeh effect to have a radial blur effect.

Then, in operation 570, the electronic device may apply the bokeh effect to the image depending on the determined bokeh characteristics for each image region. For example, FIG. 8 illustrates an example of an image 800 to which an electronic device applies the bokeh effect to have a radial blur effect. Referring to FIG. 8, the blurring effect of the image is small for a region including a shape of a person in the image. In addition, the further away from the center of the image, the greater the blurring of the image for the background image. In addition, it may be seen that a direction 801 of the bokeh effect applied to the background region appears as if the image rotates.

Figure 9:
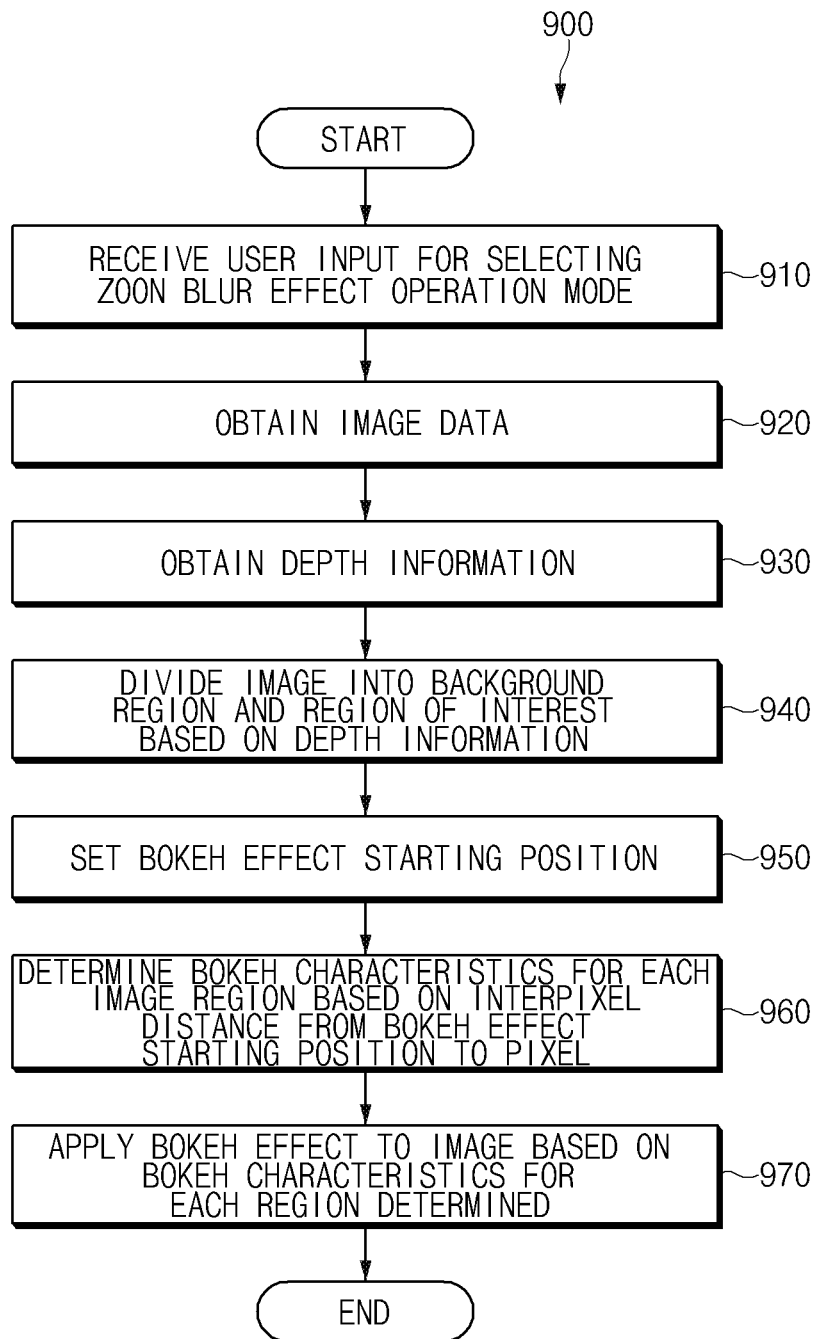
FIG. 9 flowchart illustrating a process in which an electronic device applies a bokeh effect to an image to have a zoom blur effect, according to an embodiment.

FIG. 9 is a flowchart 1000 illustrating a process in which an electronic device (e.g., the electronic device 101 of FIG. 1 or the electronic device 200 of FIG. 2) applies a bokeh effect to an image to have a zoom blur effect, according to an embodiment.

According to an embodiment, the electronic device may receive a user input for selecting a bokeh application mode using an input device (e.g., the input device 150 of FIG. 1). For example, the user input may include a touch input received through a touch screen. According to another embodiment, a form of the user input may be variously modified. For another example, the electronic device may select the bokeh application mode based on an operation state of the electronic device. For example, when the electronic device is in a state of performing a zoom in or zoom out operation while taking a picture, the electronic device may select the bokeh application mode as a zoom blur effect mode. When the electronic device automatically selects the bokeh application mode based on a sensor or the operating state of the electronic device, the electronic device may automatically implement an advanced photographing technology utilized for capturing the image using the camera. Referring to operation 910 of FIG. 9, the electronic device may receive a user input selecting a "zoom" blur effect operation mode, which is one of bokeh application modes. The zoom blur effect refers to a photo effect generated in photographic capture, when the camera captures the image in the midst of performing the zoom in or zoom out operation.

Subsequently, in operation 920, the electronic device may obtain image data including the image. In operation 930, the electronic device may obtain depth information for the obtained image data. Thereafter, in operation 940, the electronic device may divide the image into a background region and a region of interest (e.g., focal region), based on the depth information. For example, the electronic device may classify pixels having similar depth values in a depth map included in the depth information as one group and may set a region in which the pixels included in the classified group are located as the background region or the region of interest.

In operation 950, the electronic device may set a bokeh effect starting position in the image. According to an embodiment, the electronic device may execute an image recognition process of the image. As a result of performing the image recognition process, the electronic device may determine where a subject of interest is located within the image. The electronic device may determine the bokeh effect starting position based on the region where the subject of interest is located. For example, when a face is the object of interest, the electronic device may determine a region where the face is located in the image, and may determine a center point (e.g., a center of gravity) of the region as the bokeh effect starting position. For example, referring to FIG. 10, the electronic device may determine a center point (1025 of FIG. 10) of a region (1010 of FIG. 10) where the face of the person is displayed within an image (600 of FIG. 10) as the bokeh effect starting position. In FIG. 9, operation 950 is illustrated to be performed after operation 940, but an operation order of operations 940 and 950 may be changed according to an embodiment.

Figure 10:
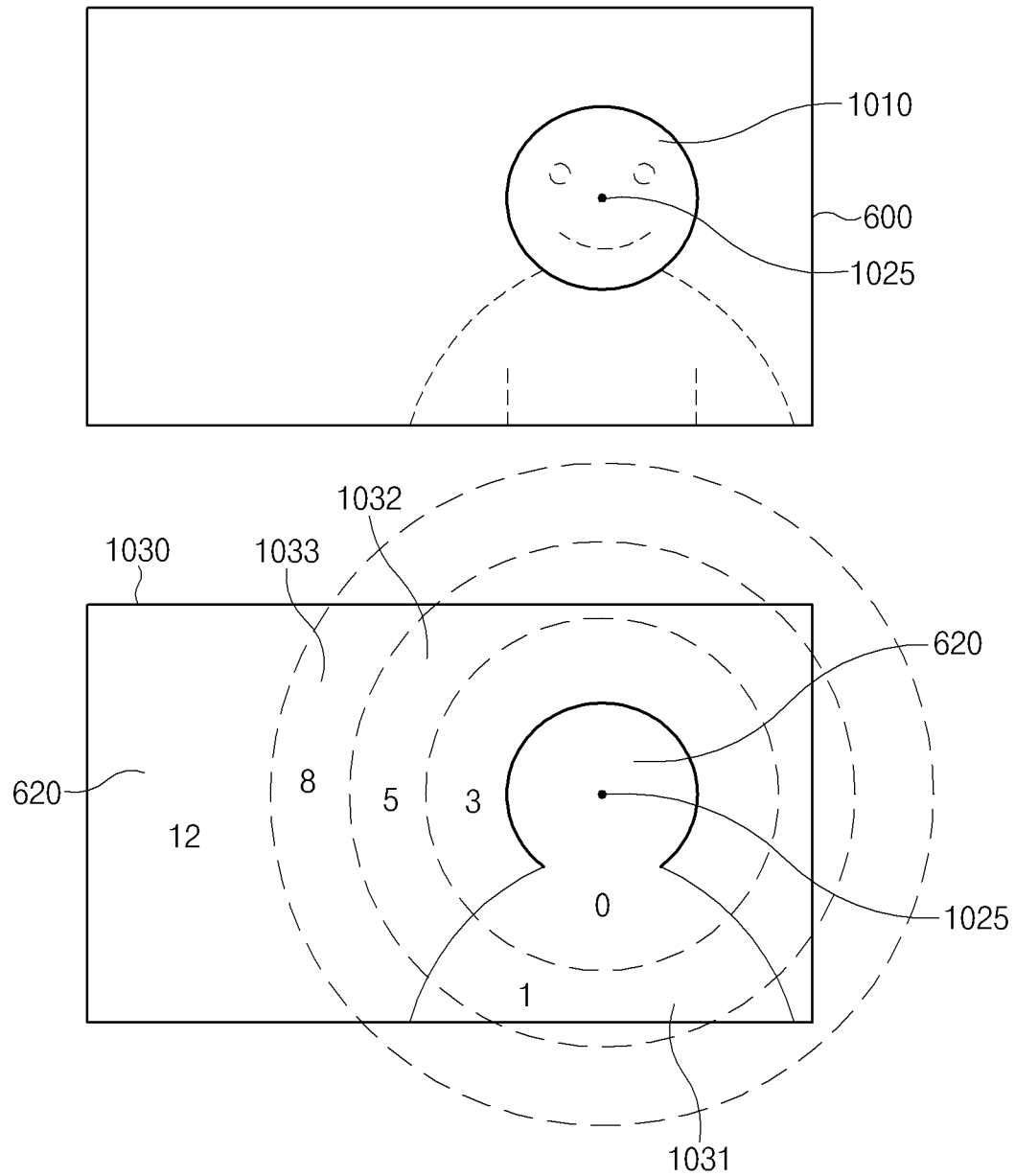
FIG. 10 conceptually illustrates an example of a bokeh effect starting position determined by an electronic device and an example of a bokeh characteristics for each image region based on the bokeh effect starting position, according to an embodiment.

Thereafter, in operation 960, the electronic device may determine the bokeh characteristics for each image region based on an interpixel distance from the bokeh effect starting position to each respective pixel. Here, the interpixel distance may indicate a distance between two pixels in the image. According to an embodiment, the electronic device may determine the bokeh characteristics for each image region such that the farther from the bokeh effect starting position, the greater the intensity of the bokeh effect. In addition, In addition, the electronic device may determine that the bokeh effect is not applied to the region of interest or the region of interest has a weaker bokeh effect than the bokeh effect of the background region to provide the bokeh characteristics for each image area with respect to the region of interest. For example, referring to the example 1030 of the bokeh characteristics for each image region illustrated in FIG. 10, the farther from a center point 1025, the greater the intensity of the bokeh effect. Referring to FIG. 10, the intensity of the bokeh effect of a region 1032 is set to '5', and the bokeh intensity of a region 1033 located farther from the center point 1025 than the region 1032 is set to '8'. Also, although the distance between the pixels from the center point 1025 is the same, the intensity of the bokeh effect determined depending on the region to which the pixel belongs may vary. Referring to FIG. 10, although a region 1031 included in the region of interest 610 has the same interpixel distance to the region 1032 from the center point 1025, the intensity of the bokeh effect for the region 1031 included in the region of interest 610 is set to '1'.

According to another embodiment, in operation 960, the electronic device may determine the bokeh characteristics for each image region based on a difference between a depth value of the depth information on the bokeh effect starting position and a depth value of the depth information on the pixel in which the bokeh characteristics for each image region is to be determined. For example, the electronic device may determine the bokeh characteristics for each image region such that the bokeh effect is more strongly applied as the depth value for the pixel is larger than the depth value for the bokeh effect starting position.

Figure 11:
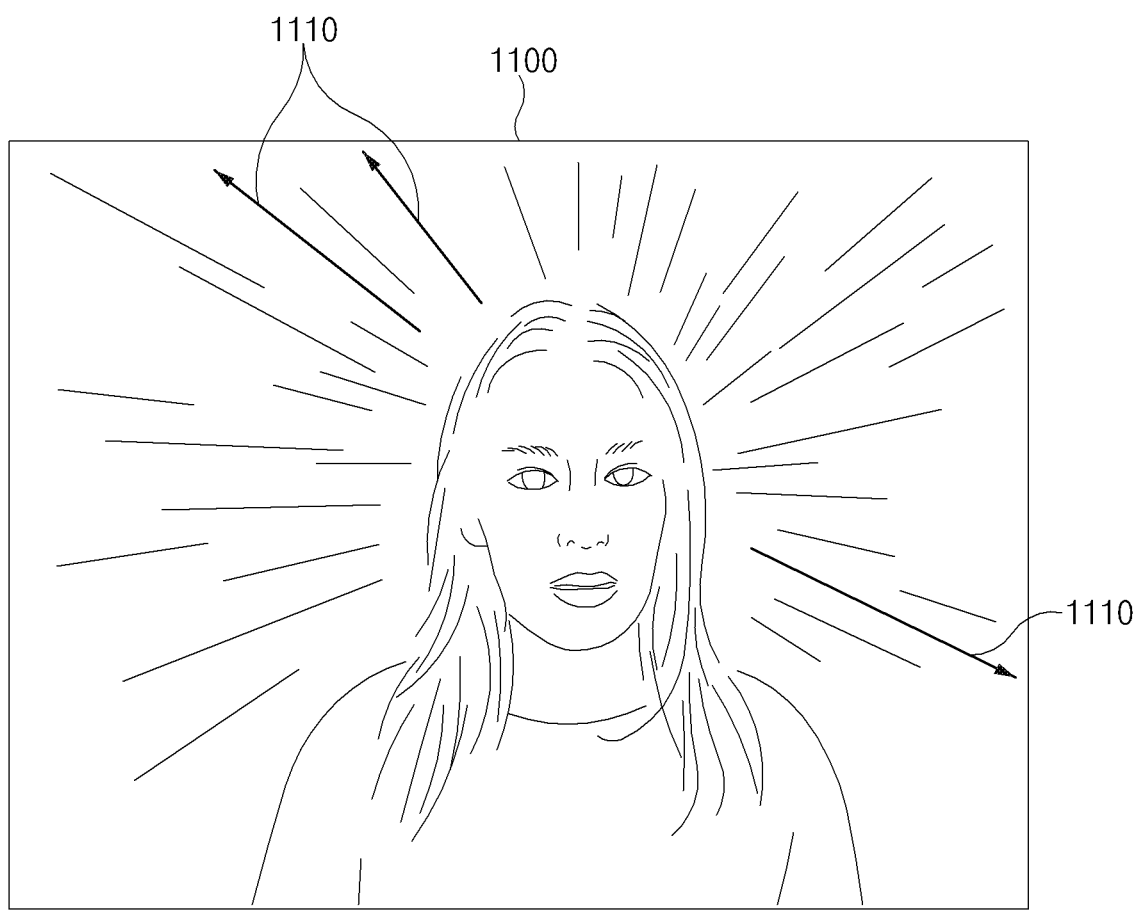
FIG. 11 illustrates an example of an image to which an electronic device according to an embodiment applies a bokeh effect to have a zoom blur effect.

Then, in operation 970, the electronic device may apply the bokeh effect to the image according to the determined bokeh characteristics for each image region. For example, FIG. 11 illustrates an example of an image 1100 to which an electronic device according to an embodiment applies the bokeh effect to have a zoom blur effect. Referring to FIG. 11, the blurring effect of the image is small for a region including a shape of a person in the image. In addition, the further away from a center of the image, the greater the blurring of the image for the background image. In addition, a direction 1110 of the bokeh effect applied to the background region appears in a straight line direction extending toward the pixel from the center position.

Figure 12:
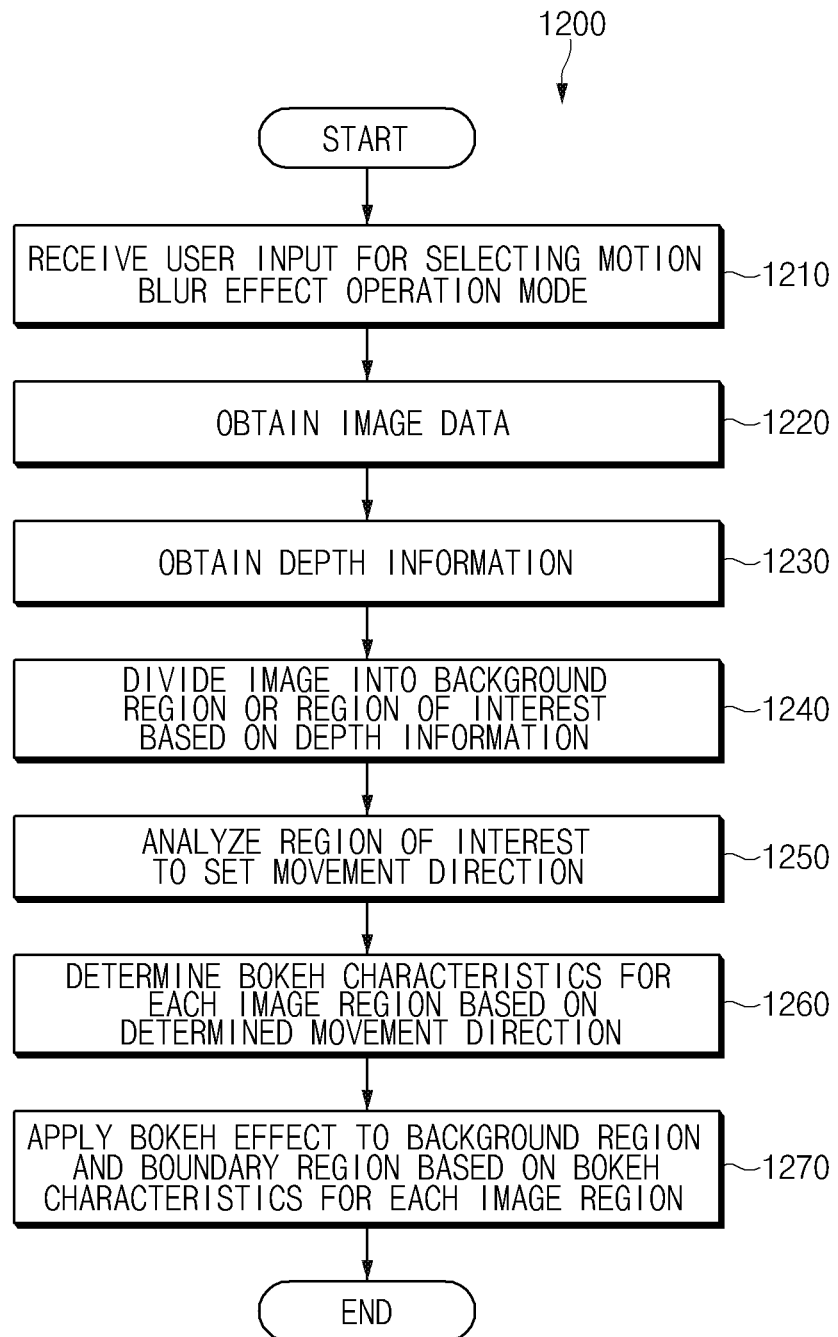
FIG. 12 is a flowchart illustrating a process in which an electronic device according to an embodiment applies a bokeh effect to have a motion blur effect.

FIG. 12 is a flowchart 1200 illustrating a process in which an electronic device (e.g., the electronic device 101 of FIG. 1 or the electronic device 200 of FIG. 2) applies a bokeh effect to have a motion blur effect.

According to an embodiment, the electronic device may receive a user input for selecting a bokeh application mode using an input device (e.g., the input device 150 of FIG. 1). Referring to operation 1210 of FIG. 12, the electronic device may receive a user input selecting a motion blur effect operation mode, which is one bokeh application mode. The motion blur effect operation mode refers to a photographic effect generated during image capture, when a moving subject is captured in focus, while the camera tracks the subject, typically resulting in a linearly blurred background.

Subsequently, in operation 1220, the electronic device may obtain image data including the image. In operation 1230, the electronic device may obtain depth information about the obtained image. Thereafter, in operation 1240, the electronic device may divide the image into a background region and a region of interest based on the depth information. For example, the electronic device may classify pixels having similar depth values in a depth map included in the depth information as one group and may set a region in which the pixels included in the classified group are located as the background region or the region of interest.

Figure 13:
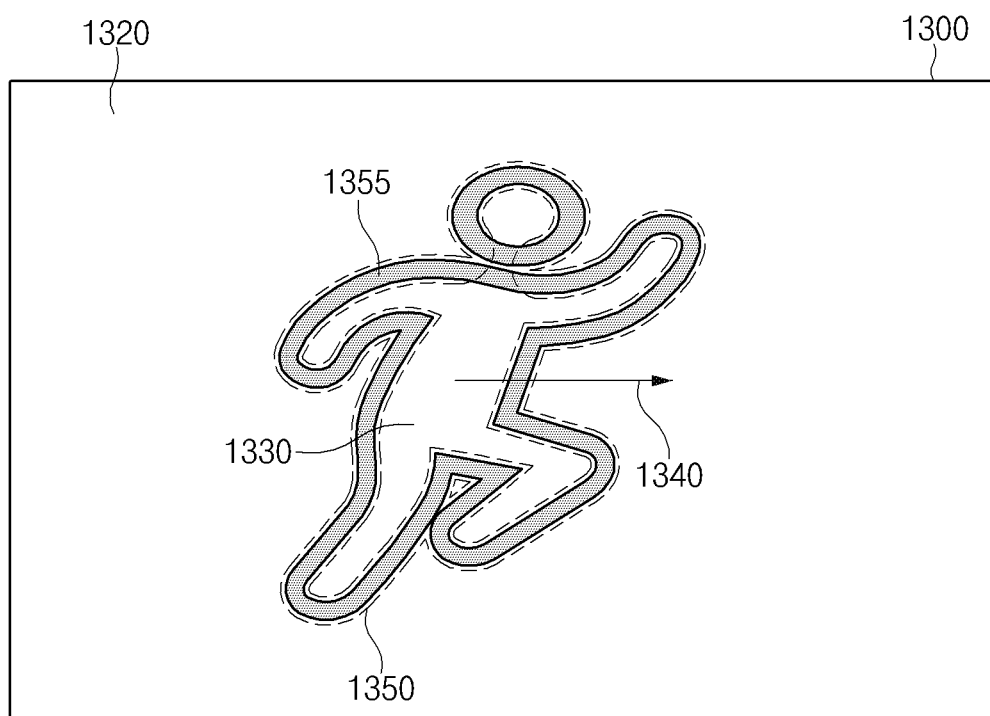
FIG. 13 conceptually illustrates an example of a bokeh characteristics for each image region in which an electronic device according to an embodiment determines to have a motion blur effect.

Then, in operation 1250, the electronic device may analyze the image included in the region of interest. As a result of analyzing the image included in the region of interest, the electronic device may determine a movement direction of the subject photographed in the region of interest. For example, the processor may analyze the features of a human body or a vehicle, and using image recognition techniques, determine a 'front' side to the human body or vehicle depicted in the image. The movement direction may then be estimated according to the estimated 'front' side of the objected depicted (e.g., a user running forwards, or a car traveling forwards, as seen in FIG. 13). Thereafter, in operation 1260, the electronic device may determine the bokeh characteristics for each image region based on the determined movement direction. For example, referring to a conceptual diagram 1300 of the bokeh characteristics for each image region in which the motion blur effect conceptually illustrated in FIG. 13 is shown, the electronic device may analyze a region of interest 1330 where the moving subject is captured to determine a movement direction 1340. The electronic device may determine the bokeh characteristics for each image region such that the direction of the bokeh effect corresponding to the movement direction 1340 determined with respect to a background region 1320 is applied. According to an embodiment, the electronic device may determine the bokeh characteristics for each image region of a boundary region 1350 such that the bokeh effect is applied to the boundary region 1350 including a boundary line 1355 adjacent to the region on interest 1330 and the background region 1320. After the movement direction is determined, then in operation 1270, the bokeh effect may be applied to a background to simulate a motion blur for a background of the image, giving the impression that the subject is moving.

Figure 14:
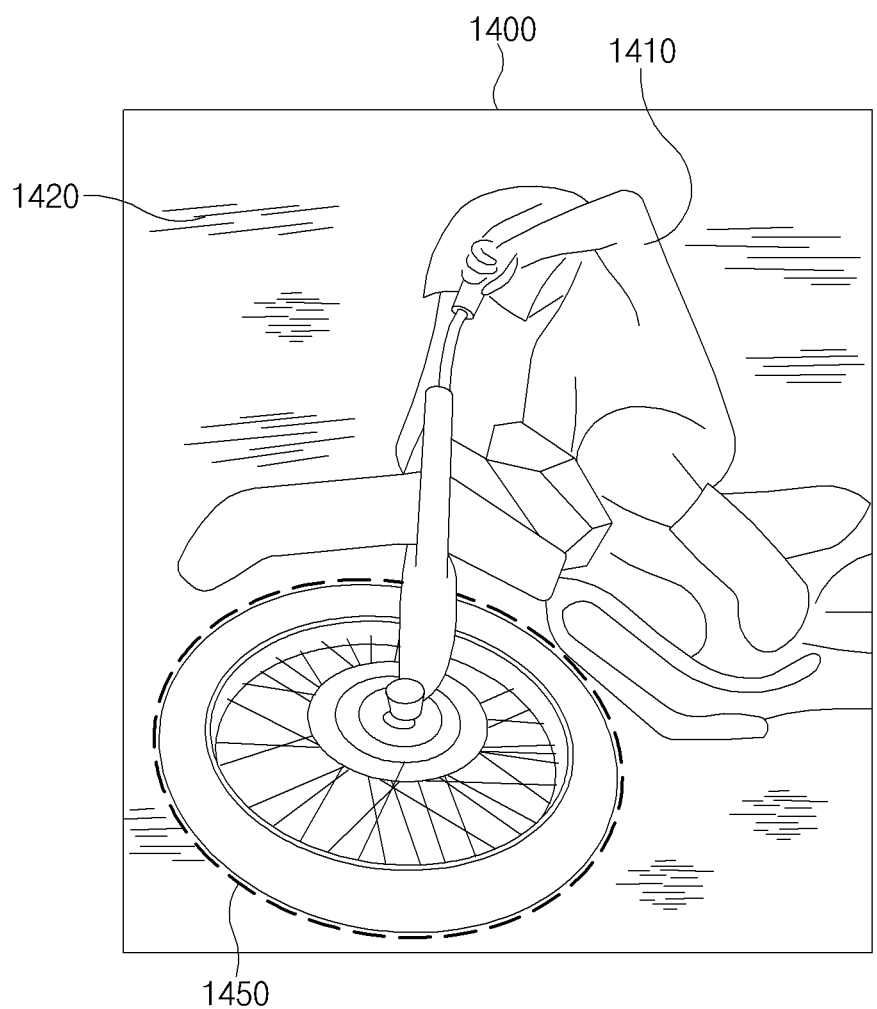
FIG. 14 illustrates an example of an image to which a bokeh effect is applied by an electronic device according to an embodiment to have a motion blur effect.

FIG. 14 is an example of an image 1400 to which an electronic device applies a bokeh effect to generate a motion blur effect. Referring to FIG. 14, a region of interest 1410 is identified which includes a motorcycle and a person. A bokeh effect is not applied to the motorcycle and the person. In contrast, a bokeh effect is applied to a background region 1420 and a boundary region 1450, thereby blurring the background of the image and creating a greater illusion that the motorcycle and the user are moving in the detected direction.

Figure 15:
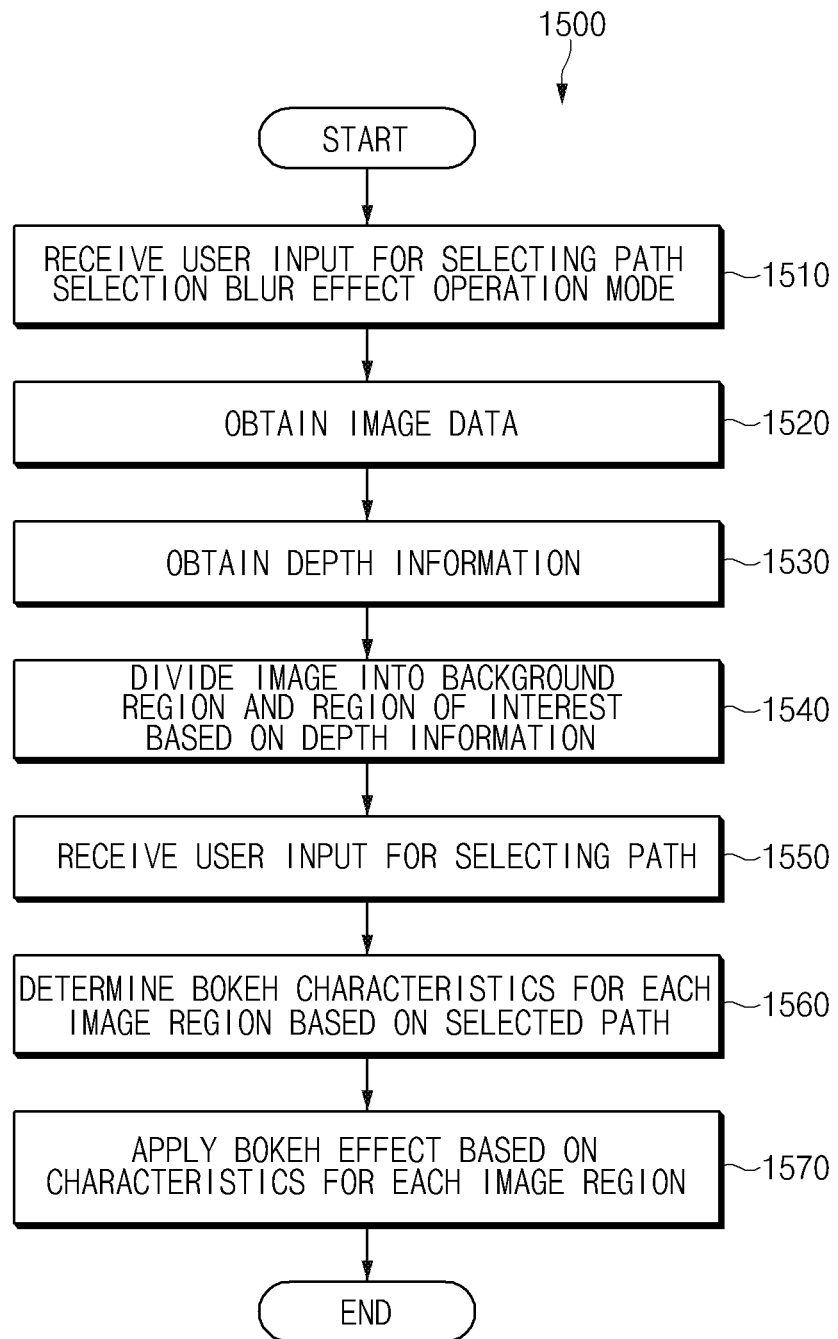
FIG. 15 a flowchart illustrating a process in which an electronic device according to an embodiment applies a bokeh effect based on a path input by a user.

FIG. 15 a flowchart 1500 illustrating a process in which an electronic device (e.g., the electronic device 101 of FIG. 1 or the electronic device 200 of FIG. 2) according to an embodiment applies a bokeh effect based on a path input by a user.

According to an embodiment, the electronic device may receive a user input for selecting a bokeh application mode using an input device (e.g., the input device 150 of FIG. 1). Referring to operation 1510 of FIG. 15, the electronic device may receive the user input selecting a path selection blur effect operation mode, which is one bokeh application mode. The path selection blur effect may indicate a bokeh effect in which a region and a direction in which the bokeh effect is applied are determined based on a selected path (e.g., a user tracing or otherwise inputting the desired path for the effect).

Subsequently, in operation 1520, the electronic device may obtain image data including the image. In operation 1530, the electronic device may obtain depth information for the obtained image data. Thereafter, in operation 1540, the electronic device may divide the image into a background region and a region of interest based on the depth information. For example, the electronic device may classify pixels having similar depth values in a depth map included in the depth information as one group and may set a region in which the pixels included in the classified group are located as the background region or the region of interest. For example, referring to FIG. 16, the electronic device may divide an image 1600 into a region of interest 1610 where a main subject is displayed and a background region 1620.

In operation 1550, the electronic device may receive a user input selecting a path through an input device (e.g., the input device 150 of FIG. 1). For example, a user input may include a drag input starting from a first position and ending at a second position on a touch screen on which the image is displayed. Alternatively, the electronic device may receive a user input from another type of an input device. According to an embodiment, the electronic device may perform operation 1550 after the electronic device displays the image.

Furthermore, in operation 1560, the electronic device may determine the bokeh characteristics for each image region based on the selected path. Here, the electronic device may determine the bokeh characteristics for each image region by further considering a region to which the pixel belongs among the background region or the region of interest classified based on the depth information.

Figure 16:
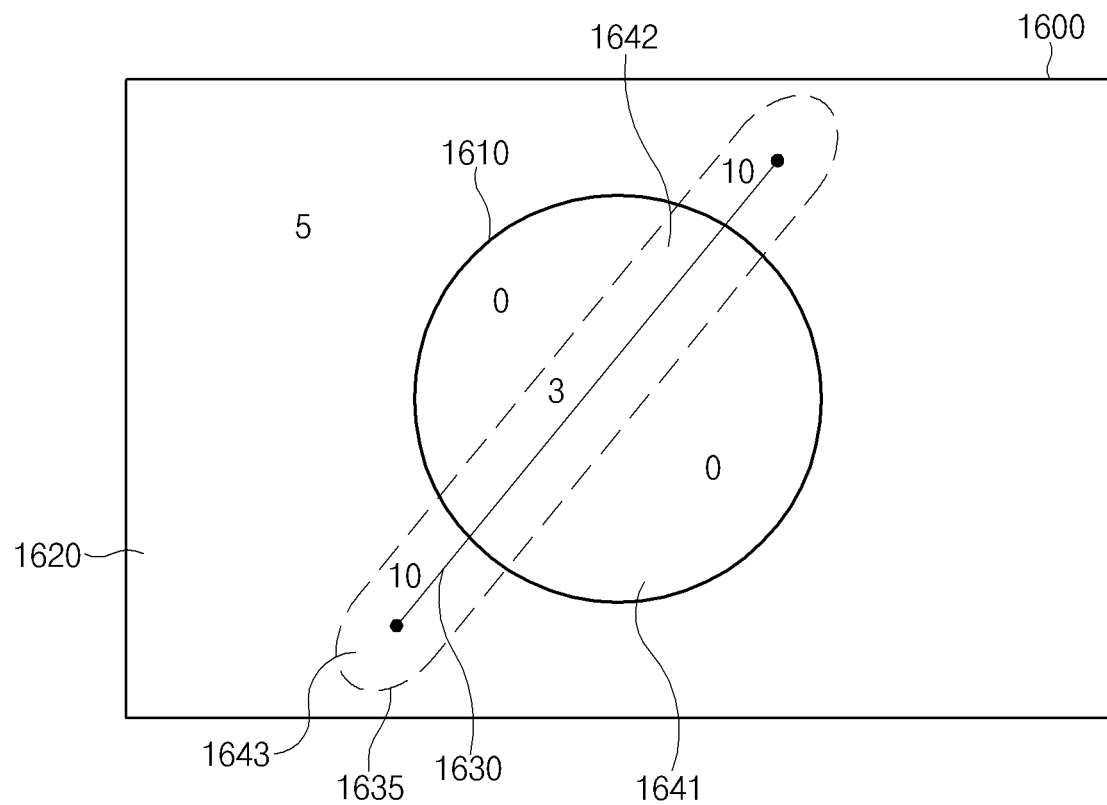
FIG. 16 conceptually illustrates an example in which an electronic device according to an embodiment determines a bokeh characteristics for each image region based on an input path.

Referring to FIG. 16, when a path 1630 is indicated by the user input, the electronic device may determine a path region 1635, including the path 1630. The electronic device may determine the bokeh characteristics for each image region such that a large bokeh effect is applied to the path region. For example, the intensity of the bokeh effect may be set to '0' in a region 1641 of the region of interest 1610 of FIG. 16, which is not included in the path region 1635 and the intensity of the bokeh effect may be set to '3' in a region 1642 included in the path region 1635. In addition, the electronic device may determine the bokeh characteristics for each image region such that the large bokeh effect is applied to the background region. For example, the bokeh effect may be set to '10' in a region 1643 of the background region 1620 of FIG. 16 included in the path region 1635.

Figure 17:
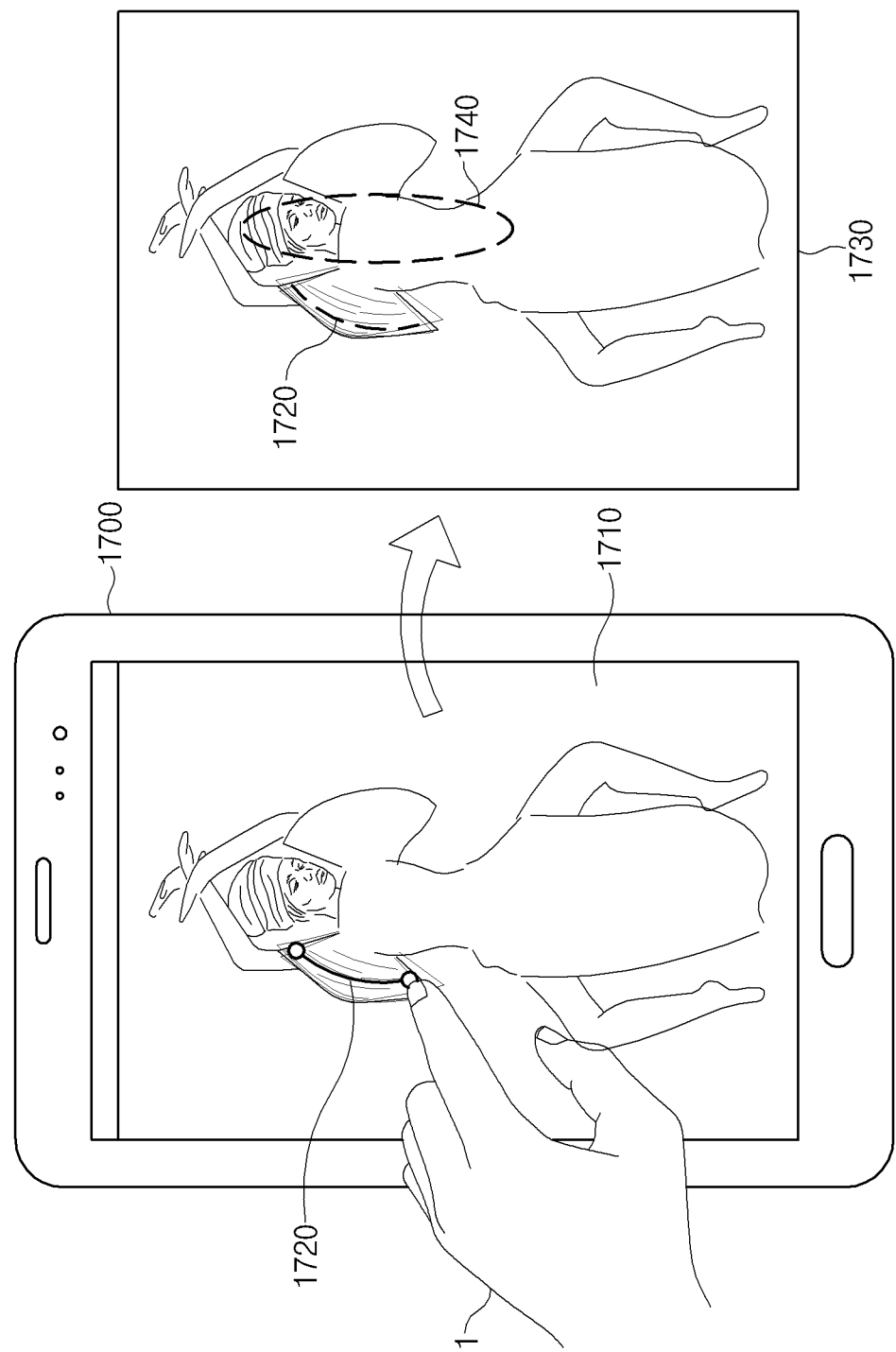
FIG. 17 is a diagram illustrating an example in which an electronic device according to an embodiment applies a bokeh effect to an image based on a method of inputting a path and the path.

Then, in operation 1570, the electronic device may apply the bokeh effect to the image depending on the determined bokeh characteristics for each image region. For example, referring to FIG. 17, an electronic device 1700 (e.g., the electronic device 101 of FIG. 1 or the electronic device 200 of FIG. 2) may display an original image 1710 on a touch screen. According to an embodiment, the original image 1710 may be an image which does not have the bokeh effect (e.g., an image in which a subject is clearly expressed). A user 1 may select a path 1720 on the touch screen using a touch input interface. The electronic device 1700 which receives the user input for selecting a path may output an image 1730 to which the bokeh effect is applied. A weak intensity bokeh effect is applied to a subject corresponding to a region of interest 1740 on the image 1730. In addition, a relatively strong intensity bokeh effect is applied to the region on the path 1720 selected by the user.

Figure 18:
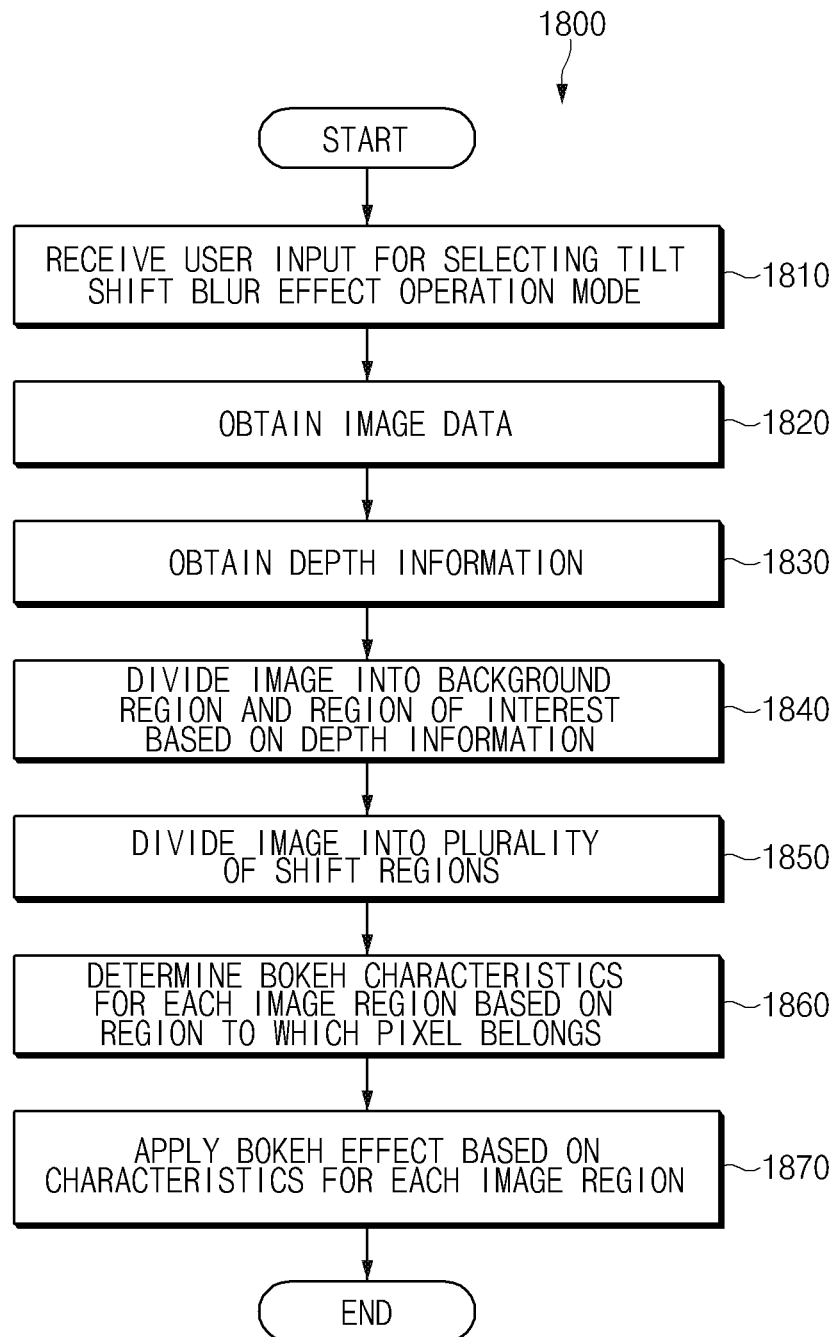
FIG. 18 is a flowchart illustrating a process in which an electronic device according to an embodiment applies a bokeh effect to an image to have a tilt shift blur effect.

FIG. 18 is a flowchart 1800 illustrating a process in which an electronic device (e.g., the electronic device 101 of FIG. 1 or the electronic device 200 of FIG. 2) according to an embodiment applies a bokeh effect to have a tilt shift blur effect.

According to an embodiment, the electronic device may receive a user input for selecting a bokeh application mode using an input device (e.g., the input device 150 of FIG. 1). Referring to operation 1810 of FIG. 18, the electronic device may receive a user input for selecting a "tilt" shift blur effect mode, which is a bokeh application mode. The tilt shift blur effect refers to a photographic effect which appears in a captured image, when the image is taken while tilting the camera.

Then, in operation 1820, the electronic device may obtain image data including an image. In operation 1830, the electronic device may obtain depth information on the obtained image data. Thereafter, in operation 1840, the electronic device may divide the image into a background region and a region of interest based on the depth information. For example, the electronic device may classify pixels having similar depth values in a depth map included in the depth information as one group and may set a region in which the pixels included in the classified group are located as the background region or the region of interest.

In operation 1850, the electronic device may divide the image into a plurality of shift regions. For example, referring to FIG. 19, the electronic device may divide an image 1910 into a clear region 1911, a fade region 1912, and a blur region 1913.

Figure 19:
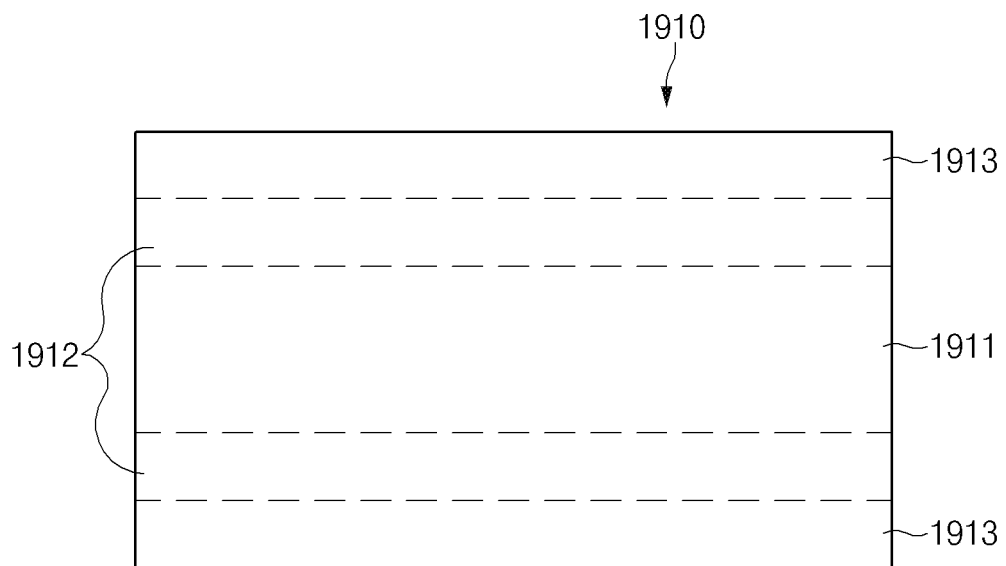
FIG. 19 illustrates a concept of an image divided into a plurality of shift regions by an electronic device according to an embodiment and a bokeh characteristics for each image region.
Figure 19:
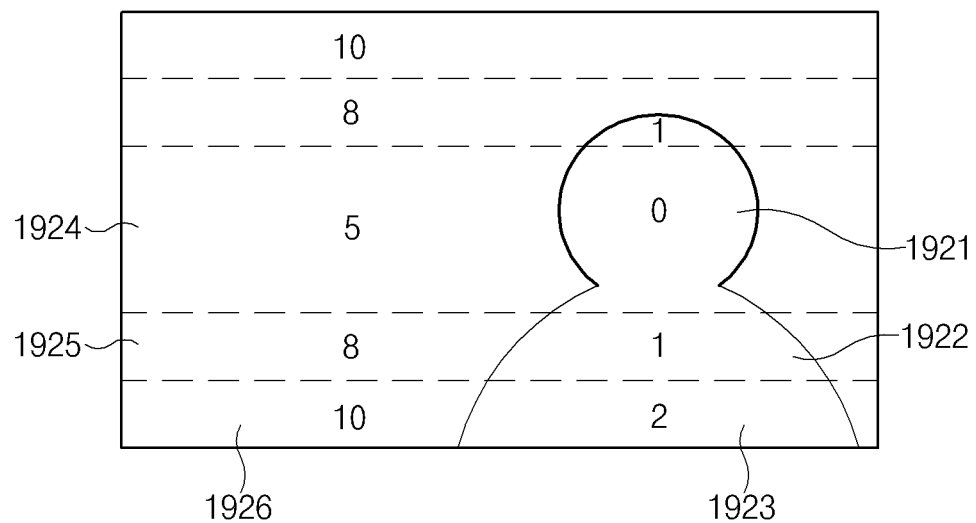

Subsequently, in operation 1860, the electronic device may determine the bokeh characteristics for each image region based on the shift region and the region of interest/background region. For example, in one embodiment, the electronic device may determine the bokeh characteristic such that high intensity of the bokeh effect is applied in the order of a region of interest included in a clear region (e.g., the region 1921 of FIG. 19), a region of interest included in a fade region (e.g., the region 1922 of FIG. 19), and a region of interest included in a blur region (e.g., the region of 1923 of FIG. 19), a background region included in a fade region (e.g., the region 1925 of FIG. 19), and a background region included in a blur region (e.g., region 1926 of FIG. 19). In FIG. 19, the intensity of the bokeh effect is set to '5' for the background region included in the clear region (e.g., the region 1924 of FIG. 19). However, in other embodiments, the bokeh effect may be not applied (or the intensity of the bokeh effect is 0) to the background region included in the clear region (e.g., the region 1924 of FIG. 19), or yet further still, the electronic device may apply the bokeh effect with the same intensity as the region of interest included in clear region (e.g., the region 1921 of FIG. 19). Finally, in operation 1870, the bokeh effects may be applied to the image according to the characteristics for each image region.

Figure 20:
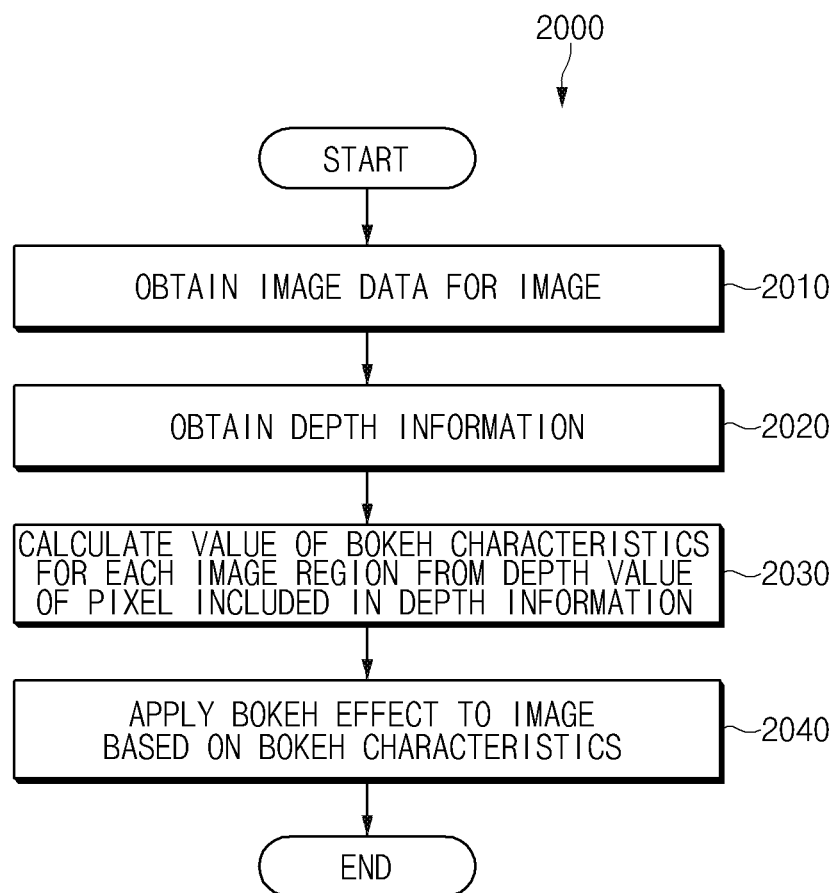
FIG. 20 a flowchart illustrating a process in which an electronic device applies a bokeh effect to an image based on a depth value.

FIG. 20 a flowchart 2000 illustrating a process in which an electronic device (e.g., the electronic device 101 of FIG. 1 or the electronic device 200 of FIG. 2) applies a bokeh effect to an image based on a depth value.

According to an embodiment, in operation 2010, the electronic device may obtain image data including an image. In operation 2020, the electronic device may obtain depth information on the image.

Then, in operation 2030, the electronic device may calculate a value of the bokeh characteristics for each image region from the depth value of the pixel included in the depth information. For example, the electronic device may determine a value obtained by multiplying a depth value for a pixel by a weight specified as the intensity of a bokeh effect to be applied to the pixel.

According to an embodiment, in operation 2030, the electronic device may input a depth value to a depth-to-characteristics conversion function to calculate a value of the bokeh characteristics for each image region. The depth-to-characteristics conversion function may return a value of a bokeh characteristics corresponding to the depth value when a depth value is input. The electronic device may determine the value returned by the depth-to-characteristics conversion function as the bokeh characteristics for each image region with respect to each pixel. According to an embodiment, as the depth value becomes greater, the electronic device determines the intensity of the bokeh effect to have a greater value.

Then, in operation 2040, the electronic device may apply the bokeh effect to the image based on the determined bokeh characteristics for each image region.

FIG. 20 is a flowchart 2000 illustrating a process in which an electronic device (e.g., the electronic device 101 of FIG. 1 or the electronic device 200 of FIG. 2) applies a bokeh effect to an image based on a depth map.

According to an embodiment, in operation 2010, the electronic device may obtain image data including an image. In operation 2020, the electronic device may obtain depth information including a depth map of the image.

Then, in operation 2030, the electronic device may configure a bokeh characteristics map corresponding to the depth value of the depth map. Thereafter, in operation 2040, the electronic device may apply a bokeh effect to the image based on the bokeh characteristics map included in the bokeh characteristics for each image region.

An electronic device (e.g., the electronic device 101 of FIG. 1 or the electronic device 200 of FIG. 2) according to an embodiment may include a memory (e.g., the memory 130 of FIG. 1 or the memory 260 of FIG. 2).) and a processor (e.g., the processor 120 of FIG. 1 or the processor 220 of FIG. 2) electrically connected to the memory. The memory may store instructions that the process is capable of execute. The processor executes instructions to obtain image data including an image including a plurality of pixels, obtain depth information associated with the plurality of pixels, determine bokeh characteristics for each image region in the image using the depth information, and apply a bokeh effect to the plurality of pixels based on the bokeh characteristics for each image region.

According to an embodiment, the processor may execute instructions to the obtain image data for the image including the plurality of pixels. The processor may determine a region of interest and a background region in the image using the depth information associated with the plurality of pixels. The processor may determine bokeh characteristics for each first image region for the region of interest based on a first characteristics criterion, determine bokeh characteristics for each second image region for the background region based on a second characteristics criterion distinguished from the first characteristics criterion, and apply the bokeh effect to the plurality of pixels based on the bokeh characteristics for each first image region and the bokeh characteristics for each second image region.

According to an embodiment, the bokeh characteristics for each first image region and the bokeh characteristics for each second image region may include an intensity of the bokeh effect to be applied to a pixel included in a region. The processor may determine the intensity of the bokeh effect to a large value with respect to the bokeh characteristics for each first image region and the bokeh characteristics for each second image region as a depth value included in the depth information increase.

According to an embodiment, the bokeh characteristics for each image region (e.g., the bokeh characteristics for each first image region and the bokeh characteristics for each second image region) may include the intensity of the bokeh effect to be applied to pixels included in the region in which the bokeh characteristics for each image region is set. According to an embodiment, as the depth value included in the depth information become greater, the processor may determine the intensity of the bokeh effect to have greater value.

According to an embodiment, the electronic device may include a camera module (e.g., the camera module 180 of FIG. 1 or the camera module 280 of FIG. 2) including an image sensor for capturing the image. The processor may determine the depth information of a peripheral pixel based on a difference between a distance value measured for a center pixel corresponding to a center position designated in the image sensor and a distance value measured for the peripheral pixel except the center pixel.

According to an embodiment, the processor may divide the image into the region of interest and the background region using the depth information and differently determine the bokeh characteristics for each image region (e.g., the bokeh characteristics for each first image region and the bokeh characteristics for each second image region) based on the region to which each of the plurality of pixels of the region of interest or the background region belongs.

According to an embodiment, the processor may determine the bokeh characteristics for each image region (e.g., the bokeh characteristics for each first image region and the bokeh characteristics for each second image region) based on image height information of the image and the region to which each of the plurality of pixels belongs.

According to an embodiment, the electronic device may include a camera module capable of capturing the image through a camera and obtaining a depth value based on a distance to a subject corresponding to a region in the image. The depth information may include a depth map including the depth value and the processor may determine the bokeh characteristics for each image region (e.g., the bokeh characteristics for each first image region and the bokeh characteristics for each second image region) using the depth map.

According to an embodiment, the camera module may include a multi-camera including a plurality of cameras or a sensor capable of detecting the depth.

According to an embodiment, the depth information may include a depth value for each of the plurality of pixels. The processor may input a depth value to a depth-to-characteristics conversion function and determine the value returned by the depth-to-characteristics conversion function as the bokeh characteristics for each image region with respect to each of the plurality of pixels.

According to an embodiment, the bokeh characteristics for each image region (e.g., the bokeh characteristics for each first image region and the bokeh characteristics for each second image region) may include a direction of the bokeh effect to be applied to pixels included in the region.

The electronic device according to an embodiment may determine the direction of the bokeh effect based on a user input through an input device (e.g., the input device 150 of FIG. 1).

According to an embodiment, the user input may include an input for selecting a bokeh application mode. When the selected bokeh application mode based on the user input is a first mode (e.g., a radial blur effect operation mode), the processor may determine a direction of a tangential vector of a circumference, which has a center position designated in the image and has a radius from the center position in the image to the pixel, as a direction of the bokeh effect for the pixel. Alternatively, when the selected bokeh application mode based on the user input is a second mode (e.g., a zoom blur effect operation mode), the processor may determine a straight line direction extending toward the pixel from the center position as the direction of the bokeh effect for the pixel.

According to an embodiment, the electronic device may receive the user input including an input for selecting a path located on the image through an input device. The processor may determine the bokeh characteristics for each image region (e.g., the bokeh characteristics for each first image region and the bokeh characteristics for each second image region) based on the selected path and depth information.

According to an embodiment, the processor may divide the image into the region of interest and the background region using the depth information and set a starting position of the bokeh effect in the region of interest. The processor may determine the bokeh characteristics for each image region (e.g., the bokeh characteristics for each first image region and the bokeh characteristics for each second image region) for the plurality of pixels based on an interpixel distance from the bokeh effect starting position to the pixels.

According to an embodiment, the processor may detect a subject of interest included in the region of interest and determine the starting position of the bokeh effect in the region in which the subject of interest is displayed.

According to an embodiment, the processor may determine a center point (e.g., a center of gravity) of the region where the subject of interest is displayed as the bokeh effect starting position.

According to an embodiment, the processor may divide image into the region of interest and the background region using the depth information. The processor may analyze a movement direction of the subject in the divided region of interest. The processor may determine the bokeh characteristics for each image region (e.g., the bokeh characteristics for each first image region and the bokeh characteristics for each second image region) with respect to the background region based on the movement direction of the subject.

According to an embodiment, the processor may apply the bokeh effect to a boundary region including a boundary line adjacent to the region of interest and the background region.

According to an embodiment, the processor may divide a region in the image into a plurality of shift regions having shift steps (e.g., a blur region, a fade region, or a clear region) in a specified direction. The processor may determine the bokeh characteristics for each image region (e.g., the bokeh characteristics for each first image region and the bokeh characteristics for each second image region) based on the divided region of interest or the divided region using the depth information and the shift step of the shift region where the pixel belongs.

According to an embodiment, the processor may perform an image recognition process for the region of interest to classify the subject included in the region of interest. The processor may determine the bokeh characteristics for each image region of the region of interest based on the classification result of the subject. For example, when the subject is a person, the electronic device may not apply the bokeh effect, and when the subject is an object such as a building or a tree, the bokeh effect may be applied.

According to an embodiment, the electronic device may be controlled to obtain the image data including the image, obtain the depth information associated with the plurality of pixels, determine the bokeh characteristics for each image region in the image using the depth information, and apply the bokeh effect based on the bokeh characteristics for each image region to the plurality of pixels.

According to an embodiment, the electronic device may be controlled to obtain the image data of the image, obtain the depth information associated with the plurality of pixels, determine the image into the region of interest and the background region based on the depth information, determine the bokeh characteristics for each first image region for the region of interest based on the first characteristics criterion and the bokeh characteristics for each second image region for the background region based on the second characteristics criterion distinguished from the first characteristics criterion, and apply the bokeh effect to the plurality of pixels based on the bokeh characteristics for each first image region and the bokeh characteristics for each second image region.

It should be understood that the certain embodiments of the disclosure and the terminology used herein are not intended to limit the techniques described herein to specific embodiments, but rather to include various modifications, equivalents, and/or alternatives of the embodiments. With regard to description of drawings, similar components may be marked by similar reference numerals. As used herein, singular forms may include plural forms as well unless the context clearly indicates otherwise. In the disclosure, the expressions "A or B", "at least one of A or/and B", "A, B or C", "at least one of A, B and/or C", and the like may include any and all combinations of one or more of the associated listed items. The terms, such as "first", "second" and the like used in the disclosure may be used to refer to various components regardless of the order and/or the priority and to distinguish the relevant components from other components, but do not limit the components. It will be understood that when an component (e.g., a first component) is referred to as being "(operatively or communicatively) coupled with/to" or "connected to" another component (e.g., a second component), it may be directly coupled with/to or connected to the other component or an intervening component (e.g., a third component) may be present.

According to the situation, the expression "adapted to or configured to" used herein may be used interchangeably with, for example, the expressions "suitable for", "having the capacity to", "designed to", "adapted to", "made to", or "capable of". The expression "a device configured to" may mean that the device is "capable of" operating together with another device or other components. For example, a "processor configured to (or adapted to) perform A, B, and C" may mean a dedicated processor (e.g., an embedded processor) for performing corresponding operations or a generic-purpose processor (e.g., a central processing unit (CPU) or an application processor (AP)) which may perform corresponding operations by executing one or more programs which are stored in a memory device (e.g., the memory 130).

The term "module" used in the disclosure may represent, for example, a unit including one or more combinations of hardware, software and firmware. The term "module" may be interchangeably used with the terms "unit", "logic", "logical block", "part" and "circuit". The "module" may be a minimum unit of an integrated part or may be a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to certain embodiments may be, for example, implemented by instructions stored in a computer-readable storage media (e.g., the memory 130) in the form of a program module. The instruction, when executed by a processor (e.g., the processor 120), may cause the one or more processors to perform a function corresponding to the instruction. A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), an internal memory, or the like. The instruction may contain a code made by a compiler or a code executable by an interpreter.

Each of components (e.g., modules or program module) according to certain embodiments may be implemented using one or a plurality of entities, and some subcomponents of the subcomponents described above may be omitted, or other subcomponents may be further included. Alternatively or additionally, some components (e.g., modules or program modules) may be integrated into one entity to perform the same or similar functions as those performed by respective components prior to integration. Operations performed by a module, a program module, or other components according to certain embodiments may be executed sequentially, in parallel, repeatedly, or in a heuristic method. In addition, some operations may be executed in different sequences or may be omitted. Alternatively, other operations may be added.

According to an embodiment disclosed in the disclosure, the electronic device or method capable of effectively applying the bokeh effect to the image is provided.

In addition, according to an embodiment disclosed in the disclosure, the electronic device or method capable of applying a variety of image effects desired by the user to the image is provided.

Furthermore, according to an embodiment disclosed in the present document, the electronic device or method capable of easily applying the advanced photographing technology using the camera to the image is provided.

In addition, various effects which are directly or indirectly understood through the present document may be provided.

While the disclosure has been shown and described with reference to certain embodiments thereof, it will be understood by those skilled in the art that various changes in form and details may be made therein without departing from the disclosure as defined by the appended claims and their equivalents.

What is claimed is:

1. An electronic device, comprising:
 a display;
 a memory; and
 a processor electrically connected to the memory,
 wherein, the memory stores instructions that are executable by the processor to cause the electronic device to:
 obtain image data for an image including a plurality of pixels,
 set, within the image, a region of interest and a background region, using depth information associated with each of the plurality of pixels, wherein the region of interest includes one or more first sub-regions, and the background region includes one or more second sub-regions,
 determine respective bokeh characteristics for the one or more first sub-regions and the one or more second sub-regions based on a first characteristic criterion and a second characteristic criterion, respectively, and
 process the image to apply a bokeh effect to the plurality of pixels based on the respective bokeh characteristics for the one or more first sub-regions and the one or more second sub-regions,
 wherein the respective bokeh characteristics for the one or more first sub-regions and the one or more second sub-regions indicate respective intensities of the bokeh effect, and
 wherein the instructions are executable by the processor to cause the electronic device to:

identify a drag input on the display on which the image is displayed, identify at least one third sub-region through which the drag input passes among the one or more first sub-regions and at least one fourth sub-region through which the drag input passes among the one or more second sub-regions, determine an intensity of the effect applied to at least one third sub-region that is higher than an intensity of the effect applied to the rest of the one or more first sub-regions, and determine an intensity of the effect applied to at least one fourth sub-region that is higher than an intensity of the effect applied to the rest of the one or more second sub-regions.

2. The electronic device of claim 1, wherein the indicated intensity of the bokeh effect increases based on an increase in depth as indicated by the depth information.

3. The electronic device of claim 1, wherein the instructions are further executable by the processor to cause the electronic device to:

obtain a height of the image, wherein the respective bokeh characteristics are determined based at least in part on the obtained height, and whether a sub-region is included in the region of interest or the background region, wherein when a radial bokeh effect is to be applied to the image data, a plurality of concentric circular regions is set for determining the respective bokeh characteristics to be applied to the image data and wherein when a first concentric circular region overlaps both the region of interest and the background, the first concentric circular region is subdivided into a first portion corresponding to the region of interest and a second portion corresponding to the background region, such that the bokeh effect is applied differently between the first and second portion.

4. The electronic device of claim 1, further comprising:

a camera for capturing the image, the camera including at least one of a plurality of image sensors, and a depth-detection sensor.

5. The electronic device of claim 1, wherein the depth information includes a depth value for each pixel of the plurality of pixels, and wherein the instructions are executable by the processor to cause the electronic device to:

generate the respective bokeh characteristics for each pixel by processing depth values for each pixel using a depth-to-characteristic conversion function.

6. The electronic device of claim 1, wherein at least one of the respective bokeh characteristics includes a direction for the bokeh effect to be applied to each pixel of the plurality of pixels.

7. The electronic device of claim 6, further comprising:

an input device, wherein the instructions are executable by the processor to: determine the direction for the bokeh effect based on another user input received through the input device.

8. The electronic device of claim 7, wherein the user input selects a bokeh application mode, wherein the instructions are further executable by the processor to cause the electronic device to:

when the selected bokeh application mode is a first mode, detect a direction of a tangential vector of a pixel on a circumference, the circumference centered on a center of the image and having a radius defined as an interpixel distance from the center to the pixel, and set the detected direction of the tangential vector as the direction of the bokeh effect for the pixel, and when the selected bokeh application is a second mode, set a direction of a straight line extending toward the pixel from the center position as the direction of the bokeh effect for the pixel.

9. The electronic device of claim 3, wherein the instructions are executable by the processor to: determine a starting position for the bokeh effect within the region of interest, wherein the bokeh characteristics are further based at least on the determined starting position, wherein a second concentric circular region overlaps both the region of interest and the background, the second concentric circular region is subdivided into a third portion corresponding to the region of interest and a fourth portion corresponding to the background region, and wherein an intensity of the bokeh effect applied to the first portion corresponding to the region of interest differs from an intensity of the bokeh effect applied to the third portion corresponding to the region of interest.

10. The electronic device of claim 9, wherein the bokeh characteristics are determined based on at least one of:

respective differences between a height value for the starting position and height values for each of the plurality of pixels, a difference between a depth value indicated in the depth information for a pixel disposed at the starting position and depth values indicated in the depth information a remainder of the plurality of pixels, and an interpixel distance from the pixel disposed at the starting position to the remainder of the plurality of pixels.

11. The electronic device of claim 9, wherein, the instructions are executable by the processor to cause the electronic device to:

analyze the image to detect a subject of interest included in the region of interest, wherein the start position is set within a sub-region of the region of interest in which the subject of interest is disposed.

12. The electronic device of claim 11, wherein the starting position is determined to be at least one of a centerpoint of the image, and a centerpoint of the sub-region in which the subject of interest isid disposed.

13. The electronic device of claim 1, wherein, the instructions are executable by the processor to cause the electronic device to:

determine a movement direction of a subject within the region of interest; and determine bokeh characteristics for each image sub-region with respect to the background region based on the movement direction.

14. The electronic device of claim 13, wherein, the instructions are executable by the processor to cause the electronic device to:

apply the bokeh effect to a boundary region including a boundary line, the boundary region disposed adjacent to both the region of interest and the background region.

15. The electronic device of claim 1, wherein, the instructions are executable by the processor to cause the electronic device to:

divide the image into a plurality of shift regions, each shift region including a shift step value; and determine the bokeh characteristics for each of the plurality of shift regions by applying, for each shift region, a baseline bokeh value as modified by a respective shift step value.

16. The electronic device of claim 15, wherein, the instructions are executable by the processor to cause the electronic device to:
perform an image recognition process on the region of interest to identify and classify a subject disposed in the region of interest,
wherein the bokeh characteristics are further based on the classifying of the subject.

17. A method of processing an image in an electronic device, the method comprising:
obtaining image data for the image including a plurality of pixels;
obtaining depth information for each pixel of the plurality of pixels;
set within the image a region of interest and a background region, using the depth information, wherein the region of interest includes one or more first sub-regions, and the background region includes one or more second sub-regions;
determine respective bokeh characteristics for the one or more first sub-regions and the one or more second sub-regions based on a first characteristic criterion and a second characteristic criterion, respectively; and
process the image to apply a bokeh effect to the plurality of pixels based on the respective bokeh characteristics for the one or more first sub-regions and the one or more second sub-regions,
wherein the respective bokeh characteristics for the one or more first sub-regions and the one or more second sub-regions indicate respective intensities of the bokeh effect, and
wherein the method further comprises:
identifying a drag input on a display of the electronic device on which the image is displayed,
identifying at least one third sub-region through which the drag input passes among the one or more first sub-regions and at least one fourth sub-region through which the drag input passes among the one or more second sub-regions,
determining an intensity of the effect applied to at least one third sub-region that is higher than an intensity of the effect applied to the rest of the one or more first sub-regions, and
determining an intensity of the effect applied to at least one fourth sub-region that is higher than an intensity of the effect applied to the rest of the one or more second sub-regions.

18. The method of claim 17, further comprising:
obtaining a height of the image,
wherein the respective bokeh characteristics are determined based at least in part on the obtained height, and whether a sub-region is included in the region of interest or the background region,
wherein when a radial bokeh effect is to be applied to the image data, a plurality of concentric circular regions is set for determining the respective bokeh characteristics to be applied to the image data, and
when a first concentric circular region overlaps both the region of interest and the background, the first concentric circular region is subdivided into a first portion corresponding to the region of interest and a second portion corresponding to the background region, such that the bokeh effect is applied differently between the first and second portion.

19. The method of claim 18, further comprising:
determining a starting position for the bokeh effect within the region of interest,
wherein the bokeh characteristics are further based at least on the determined starting position, and
wherein a second concentric circular region overlaps both the region of interest and the background, the second concentric circular region is subdivided into a third portion corresponding to the region of interest and a fourth portion corresponding to the background region, and
wherein an intensity of the bokeh effect applied to the first portion corresponding to the region of interest differs from an intensity of the bokeh effect applied to the third portion corresponding to the region of interest.

* * * * *

UNITED STATES PATENT AND TRADEMARK OFFICE
CERTIFICATE OF CORRECTION

PATENT NO. : 11,315,224 B2
APPLICATION NO. : 16/793473
DATED : April 26, 2022
INVENTOR(S) : Jeena Hwang et al.

Page 1 of 1

It is certified that error appears in the above-identified patent and that said Letters Patent is hereby corrected as shown below:

In the Claims

Column 24, Claim 12, Line 47 should read as follows:
--...subject of interest is disposed...--

Signed and Sealed this
Fifth Day of July, 2022

Katherine Kelly Vidal
*Director of the United States Patent and Trademark Office*